(12) United States Patent  (10) Patent No.: US 7,646,459 B2
Kume et al.  (45) Date of Patent: Jan. 12, 2010

(54) LIQUID CRYSTAL DISPLAY DEVICE

(75) Inventors: Yasuhiro Kume, Kawachinagano (JP); Kazuhiko Tamai, Nabari (JP); Nobukazu Nagae, Suwa (JP); Noriaki Onishi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 761 days.

(21) Appl. No.: 11/019,635

(22) Filed: Dec. 23, 2004

(65) Prior Publication Data
US 2005/0162589 A1  Jul. 28, 2005

(30) Foreign Application Priority Data
Dec. 26, 2003  (JP)  ............................. 2003-434429
Mar. 31, 2004  (JP)  ............................. 2004-105911

(51) Int. Cl.
*G02F 1/1337*  (2006.01)
(52) U.S. Cl. ........................ 349/129; 349/114; 349/156; 349/110
(58) Field of Classification Search .................. 349/114, 349/129
See application file for complete search history.

(56) References Cited

U.S. PATENT DOCUMENTS 5,666,179 A * 9/1997 Koma .......................... 349/143
6,195,140 B1 2/2001 Kubo et al. .................... 349/44

(Continued)

FOREIGN PATENT DOCUMENTS
JP  04-223428  8/1992

(Continued)

OTHER PUBLICATIONS

KR Notice of Reasons for Rejection and English translation thereof mailed Apr. 25, 2006 in corresponding Korean application No. 10-2004-0111913.

(Continued)

*Primary Examiner*—Richard H Kim
(74) *Attorney, Agent, or Firm*—Nixon & Vanderhye P.C.

(57) ABSTRACT

The liquid crystal display device includes a first substrate, a second substrate opposed to the first substrate, and a vertically aligned liquid crystal layer interposed between the first and second substrates, and has a plurality of pixels arranged in a matrix having rows and columns. Each pixel includes a first electrode formed on the first substrate, a second electrode formed on the second substrate, and the liquid crystal layer interposed between the first and second electrodes. The first substrate has a shading region in gaps between the plurality of pixels, and a wall structure is placed regularly on the surface of the first substrate facing the liquid crystal layer in the shading region. The first and second electrodes have at least one opening formed at a predetermined position in the pixel. At least an arbitrary row or column of pixels is composed of first pixels each having the first electrode to which a voltage of positive polarity with respect to the potential at the second electrode as the reference potential is supplied and second pixels each having the first electrode to which a voltage of negative polarity is supplied, arranged alternately, in a given vertical scanning period. At least one liquid crystal domain having axisymmetric alignment is formed when at least a predetermined voltage is applied across the liquid crystal layer, and the center axis of the axisymmetric alingment of the at least one liquid crystal domain is formed in or near the at least one opening.

27 Claims, 9 Drawing Sheets

U.S. PATENT DOCUMENTS

| | | | |
|---|---|---|---|
| 6,330,049 B1 | 12/2001 | Kume et al. | |
| 6,339,462 B1 | 1/2002 | Kishimoto et al. | |
| 6,424,396 B1 | 7/2002 | Kim et al. | 349/130 |
| 6,424,402 B1 | 7/2002 | Kishimoto | |
| 6,433,852 B1 | 8/2002 | Sonoda et al. | |
| 6,661,488 B1 | 12/2003 | Takeda et al. | |
| 6,710,837 B1 | 3/2004 | Song et al. | |
| 6,753,939 B2 | 6/2004 | Jisaki et al. | 349/114 |
| 6,788,375 B2 | 9/2004 | Ogishima et al. | 349/130 |
| 6,864,946 B2* | 3/2005 | Kim | 349/156 |
| 7,142,277 B2* | 11/2006 | Choi et al. | 349/155 |
| 7,223,999 B2* | 5/2007 | Jang et al. | 257/98 |
| 7,248,315 B2* | 7/2007 | Arai et al. | 349/114 |
| 7,256,847 B2* | 8/2007 | Kashima | 349/115 |
| 2002/0039166 A1* | 4/2002 | Song | 349/156 |
| 2002/0067450 A1* | 6/2002 | Moriya | 349/129 |
| 2002/0080320 A1 | 6/2002 | Suzuki et al. | |
| 2003/0076464 A1 | 4/2003 | Ozawa et al. | |
| 2003/0107695 A1 | 6/2003 | Kubo et al. | |
| 2003/0112213 A1 | 6/2003 | Noguchi et al. | |
| 2003/0133062 A1 | 7/2003 | Maeda | |
| 2004/0041770 A1* | 3/2004 | Kubo et al. | 345/96 |
| 2004/0165129 A1* | 8/2004 | Okumura | 349/114 |

FOREIGN PATENT DOCUMENTS

| | | |
|---|---|---|
| JP | 04-309926 | 11/1992 |
| JP | 2000-75302 A | 3/2000 |
| JP | 2001-125144 | 5/2001 |
| KR | 2003-058012 A | 7/2003 |
| KR | 2003-058140 A | 7/2003 |

OTHER PUBLICATIONS

U.S. Appl. No. 10/952,480, filed Sep. 29, 2004.
U.S. Appl. No. 10/980,867, filed Nov. 4, 2004.
U.S. Appl. No. 11/005,322, filed Dec. 7, 2004.

* cited by examiner

-4V Applied    Electrode    +4V Applied
               Gap

Reference Potential ; 0V

Electrode Gap

CR>10

LIQUID CRYSTAL DISPLAY DEVICE

BACKGROUND OF THE INVENTION

The present invention relates to a liquid crystal display device and a fabrication method for the same, and more particularly, to a liquid crystal display device suitably used for portable information terminals (for example, PDAs), mobile phones, car-mounted liquid crystal displays, digital cameras, PCs, amusement equipment, TVs and the like.

The information infrastructure is advancing day to day, and equipment such as mobile phones, PDAs, digital cameras, video cameras and car navigators has penetrated deeply into people's lives. Liquid crystal display (LCD) devices have been adopted in most of such equipment. With increase of the information amount handled with the main bodies of the equipment, LCD devices are requested to display a larger amount of information, and are demanded by the market for higher contrast, a wider viewing angle, higher brightness, multiple colors and higher definition.

A vertical alignment mode using a vertically aligned liquid crystal layer has increasingly received attention as a display mode enabling high contrast and a wide viewing angle. The vertically aligned liquid crystal layer is generally obtained using a vertical alignment film and a liquid crystal material having negative dielectric anisotropy.

For example, Japanese Laid-Open Patent Publication No. 6-301036 (Literature 1) discloses an LCD device in which an inclined electric field is generated around an opening formed in a counter electrode that faces a pixel electrode via a liquid crystal layer, so that liquid crystal molecules surrounding liquid crystal molecules existing in the opening, which are in the vertically aligned state, are aligned in inclined directions around the opening as the center, to thereby improve the visual angle characteristics.

However, in the device described in Literature 1, it is difficult to generate an inclined electric field over the entire region of each pixel. Therefore, each pixel has a region in which liquid crystal molecules delay in response to a voltage, and this causes a problem of occurrence of an afterimage phenomenon.

Japanese Laid-Open Patent Publication No. 2002-55347 (Literature 2) discloses a technology in which slit electrodes (an opening pattern) are provided in both pixel electrodes and a counter common electrode and, in at least either the pixel electrodes or the common electrode, steps are provided in regions having the slit electrodes to distribute an inclined electric field in four directions uniformly using the opening pattern, to thereby achieve a wide viewing angle.

Japanese Laid-Open Patent Publication No. 2003-167253 (Literature 3) discloses a technology in which a plurality of projections are provided regularly in each pixel to stabilize the aligned state of liquid crystal domains having radially inclined alignment formed around the projections. This literature also discloses using an inclined electric field generated at openings formed in an electrode, together with the alignment regulating force of the projections, to regulate the alignment of liquid crystal molecules, and thus improve the display characteristics.

In recent years, a type of LCD device providing high-quality display both outdoors and indoors has been proposed (see Japanese Patent Gazette No. 2955277 (Literature 4) and U.S. Pat. No. 6,195,140 (Literature 5), for example). In this type of LCD device, called a transflective LCD device, each pixel has a reflection region in which display is done in the reflection mode and a transmission region in which display is done in the transmission mode.

The currently available transflective LCD devices adopt an ECB mode, a TN mode and the like. Literature 3 described above discloses adoption of the vertical alignment mode for, not only a transmissive LCD device, but also a transflective LCD device. Japanese Laid-Open Patent Publication No. 2002-350853 (Literature 6) discloses a technology in which in a transflective LCD device having a vertically aligned liquid crystal layer, the alignment (multi-axis alignment) of liquid crystal molecules is controlled with depressions formed on an insulating layer. The insulating layer is provided to make the thickness of the liquid crystal layer in a transmission region twice as large as that in a reflection region. According to this literature, the depressions are in the shape of a regular octagon, for example, and projections or slits (electrode openings) are formed at positions opposed to the depressions via the liquid crystal layer (see FIGS. 3 and 16 of Literature 6, for example).

Japanese Laid-Open Patent Publication No. 2001-125144 (Literature 7) discloses a technology of adopting dot inversion drive for a vertically aligned liquid crystal display device to thereby minimize roughness of display and achieve a high contrast ratio and wide viewing angle characteristics. In Literature 7, the dot inversion drive is executed at a predetermined pixel pitch, and distortion in an electric field generated in the boundary portions of adjacent pixel electrodes is used to define the aligned directions of liquid crystal molecules. This literature describes that the pixel electrode pitch is preferably not smaller than the thickness of the liquid crystal layer and also not larger than 20 μm, to make full use of the action of the electric field. The literature also describes that an opening is provided in the center of each pixel electrode to ensure fixation of the center of the radial alignment of liquid crystal molecules to the opening to thereby further stabilize the alignment.

The technology disclosed in Literature 3 has the following problems. Projections are provided in each pixel to form a plurality of liquid crystal domains in the pixel (that is, divide the pixel into domains), to thereby strengthen the alignment regulating force on liquid crystal molecules. According to examinations conducted by the inventors of the present invention, however, to obtain sufficient alignment regulating force, it is necessary to form an alignment control structure made of projections regularly placed inside each pixel, and this complicates the fabrication process. The contrast ratio may decrease due to light leakage occurring in the peripheries of the projections in the pixel. If a light-shading portion is provided to prevent decrease in contrast ratio, the effective aperture ratio may possibly decrease. Moreover, if the alignment regulating structure is provided on the counter substrate, the substrate alignment margin must be taken into consideration. Therefore, roughness of display due to deviation of the center axes of axisymmetrically aligned domains, and the decrease of the effective aperture ratio and/or the decrease of the contrast ratio will become further conspicuous.

In the technology disclosed in Literature 6, it is necessary to provide projections or electrode openings at positions opposed to the depressions formed for control of the multi-axis alignment. This technology therefore has the same problems as those described above.

In Literature 7, in which the directions in which liquid crystal molecules tilt are defined by use of a lateral electric field (an inclined electric field component in the substrate plane) generated between adjacent pixel electrodes by adopting the dot inversion drive, the stability of the aligned state is dependent on the shape of the electrodes. Also, sufficient alignment regulating force will not be exerted in a grayscale display state having a low electric field. Moreover, as is selfexplanatory from the aligned directions of liquid crystal molecules existing in the four corners of each pixel electrode shown in FIG. 9 of Literature 7, the lateral electric field has directions different from each other (roughly orthogonal to each other) in each corner portion of the pixel electrode. This causes a problem of easily generating disclination (alignment defect) in the corner portions of each pixel.

In view of the above, an object of the present invention is providing a liquid crystal display device having at least one axisymmetrically aligned domain in each pixel, which can provide good axisymmetrically aligned domains even in a grayscale display state, is excellent in display quality and has wide viewing angle characteristics.

SUMMARY OF THE INVENTION

The liquid crystal display device of the present invention includes a first substrate, a second substrate opposed to the first substrate, and a vertically aligned liquid crystal layer interposed between the first substrate and the second substrate, wherein the liquid crystal display device has a plurality of pixels arranged in a matrix having rows and columns, each pixel including a first electrode formed on the first substrate, a second electrode formed on the second substrate, and the liquid crystal layer interposed between the first electrode and the second electrode, the first substrate has a shading region in gaps between the plurality of pixels, and a wall structure is placed regularly on the surface of the first substrate facing the liquid crystal layer in the shading region, at least either one of the first electrode and the second electrode has at least one opening formed at a predetermined position in the pixel, at least either one of an arbitrary row and an arbitrary column of the plurality of pixels is composed of first pixels each having the first electrode to which a voltage of positive polarity with respect to the potential at the second electrode as the reference potential is supplied and second pixels each having the first electrode to which a voltage of negative polarity is supplied, arranged alternately, in a given vertical scanning period, and at least one liquid crystal domain having axisymmetric alignment is formed when at least a predetermined voltage is applied across the liquid crystal layer, and the center axis of the axisymmetric alignment of the at least one liquid crystal domain is formed in or near the at least one opening.

In an embodiment, an arbitrary row and an arbitrary column of the plurality of pixels are respectively composed of first pixels each having the first electrode to which a voltage of positive polarity with respect to the potential at the second electrode as the reference potential is supplied and second pixels each having the first electrode to which a voltage of negative polarity is supplied, arranged alternately, in a given vertical scanning period.

In another embodiment, the polarity of the voltage supplied to the first electrode of each of the plurality of pixels is inverted every vertical scanning period.

In yet another embodiment, the first electrode has at least one first opening formed at a predetermined position in each pixel, the second electrode has at least one second opening formed at a predetermined position in each pixel, and the center axis of the axisymmetric alignment of the at least one liquid crystal domain is formed in or near at least either one of the at least one first opening and the at least one second opening.

In yet another embodiment, the at least one first opening and the at least one second opening are placed to at least overlap each other via the liquid crystal layer.

In yet another embodiment, the first electrode has at least one cut.

In yet another embodiment, a support for defining the thickness of the liquid crystal layer is placed in the shading region located in gaps between the plurality of pixels.

In yet another embodiment, the first electrode includes a transparent electrode defining a transmission region and a reflective electrode defining a reflection region, and the thickness dt of the liquid crystal layer in the transmission region and the thickness dr of the liquid crystal layer in the reflection region satisfy the relationship 0.3dt<dr<0.7dt.

In yet another embodiment, the first electrode includes a transparent electrode defining a transmission region and a reflective electrode defining a reflection region, the at least one liquid crystal domain includes a liquid crystal domain formed in the transmission region, the first electrode has at least one first opening, the second electrode has at least one second opening, the at least one first opening and the at least one second opening include an opening corresponding to the center axis of the liquid crystal domain formed in the transmission region, and the first electrode has a plurality of cuts formed point-symmetrically with respect to the opening.

In yet another embodiment, a transparent dielectric layer is selectively formed on the second substrate in the reflection region.

In yet another embodiment, the transparent dielectric layer has a function of scattering light.

In yet another embodiment, the liquid crystal display device further includes a color filter layer formed on the second substrate, wherein the optical density of the color filter layer in the reflection region is lower than that in the transmission region.

In yet another embodiment, the liquid crystal display device further includes: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

In yet another embodiment, the liquid crystal display device further includes: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

According to the second aspect of the invention, the liquid crystal display device includes a first substrate, a second substrate opposed to the first substrate, and a vertically aligned liquid crystal layer interposed between the first substrate and the second substrate, the first substrate including a plurality of scanning signal lines extending in the row direction, a plurality of data signal lines extending in the column direction, a plurality of switching elements connected to the plurality of scanning signal lines and the plurality of data signal lines, and a plurality of first electrodes connected to the plurality of data signal lines via the plurality of switching elements, the second substrate including a second electrode opposed to the plurality of first electrodes via the liquid crystal layer, the liquid crystal display device having a plurality of pixels arranged in a matrix having rows and columns, each pixel including each of the plurality of first electrodes, the second electrode and the liquid crystal layer interposed between the first electrode and the second electrode, and having a shading region in gaps between the plurality of pixels, wherein switching elements, among the plurality of switching elements, connected to one arbitrary scanning signal line among the plurality of scanning signal lines include switching elements connected to first electrodes belonging to one of a pair of rows adjacent to the arbitrary scanning signal line and switching elements connected to first electrodes belonging to the other row alternately, and an arbitrary row of the plurality of pixels includes first pixels each having the first electrode to which a voltage of positive polarity with respect to a potential at the second electrode as the reference potential is supplied and second pixels each having the first electrode to which a voltage of negative polarity is supplied, arranged alternately, during a given vertical scanning period, and at least either one of the first electrode and the second electrode has at least one opening formed at a predetermined position in each pixel, at least one liquid crystal domain having axisymmetric alignment is formed when at least a predetermined voltage is applied across the liquid crystal layer, and the center axis of the axisymmetric alignment of the at least one liquid crystal domain is formed in or near the at least one opening.

In an embodiment, the first substrate further includes a wall structure placed regularly on the surface facing the liquid crystal layer in the shading region.

In another embodiment, an arbitrary column of the plurality of pixels includes first pixels each having the first electrode to which a voltage of positive polarity with respect to the potential at the second electrode as the reference potential is supplied and second pixels each having the first electrode to which a voltage of negative polarity is supplied, arranged alternately, during a given vertical scanning period.

In yet another embodiment, the polarity of the voltage supplied to the first electrode of each of the plurality of pixels is inverted every vertical scanning period.

In yet another embodiment, the first electrode has at least one first opening formed at a predetermined position in each pixel, the second electrode has at least one second opening formed at a predetermined position in each pixel, and the center axis of the axisymmetric alignment of the at least one liquid crystal domain is formed in or near at least either one of the at least one first opening and the at least one second opening.

In yet another embodiment, the at least one first opening and the at least one second opening are placed to at least overlap each other via the liquid crystal layer.

In yet another embodiment, the first electrode has at least one cut.

In yet another embodiment, a support for defining the thickness of the liquid crystal layer is placed in the shading region.

In yet another embodiment, the first electrode includes a transparent electrode defining a transmission region and a reflective electrode defining a reflection region, and the thickness dt of the liquid crystal layer in the transmission region and the thickness dr of the liquid crystal layer in the reflection region satisfy the relationship $0.3dt<dr<0.7dt$.

In yet another embodiment, the first electrode includes a transparent electrode defining a transmission region and a reflective electrode defining a reflection region, the at least one liquid crystal domain includes a liquid crystal domain formed in the transmission region, the first electrode has at least one first opening, the second electrode has at least one second opening, the at least one first opening and the at least one second opening include an opening corresponding to the center axis of the liquid crystal domain formed in the transmission region, and the first electrode has a plurality of cuts formed point-symmetrically with respect to the opening.

In yet another embodiment, a transparent dielectric layer is selectively formed on the second substrate in the reflection region.

In yet another embodiment, the transparent dielectric layer has a function of scattering light.

In yet another embodiment, the liquid crystal display device further includes a color filter layer formed on the second substrate, wherein the optical density of the color filter layer in the reflection region is lower than that in the transmission region.

In yet another embodiment, the liquid crystal display device further includes: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

In yet another embodiment, the liquid crystal display device further includes: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

In the liquid crystal display device in the first aspect of the present invention, the directions in which liquid crystal molecules tilt during voltage application (during generation of an electric field) are defined with the slope face effect of the wall structure formed on the surface of the first substrate facing the liquid crystal layer in the shading region, so that an axisymmetrically aligned domain is formed. At least either one of an arbitrary row and an arbitrary column of the plurality of pixels has first pixels each having the first electrode to which a voltage of positive polarity with respect to the potential at the second electrode as the reference potential is supplied, and second pixels each having the first electrode to which a voltage of negative polarity is supplied, arranged alternately, in a given vertical scanning period. Accordingly, a steeply inclined electric field is generated between the first pixel and the second pixel, and with this inclined electric field, the axisymmetrically aligned domain is stabilized. The inclined electric field generated by applying voltages of opposite polarity to the first electrodes of pixels adjacent to each other acts, together with the alignment regulating force of the side slopes of the wall structure provided between the adjacent pixels and the effect of distortion of the electric field due to the existence of the wall structure, to stabilize the alignment of the axisymmetric domain. The alignment regulating force of the side slopes of the wall structure acts irrespective of generation of the electric field, and the electric field is distorted with the existence of the wall structure. Therefore, the axisymmetric alignment can be stabilized even in a grayscale display state.

The vertical scanning period as used herein typically corresponds to a frame period, and if one frame is divided into a plurality of fields, corresponds to each field period. The alternate inversion of the polarity of the voltage applied to the first electrode is most preferably adopted for both the row and column directions, but may be for either one of the directions. Since the pixels are generally elongate in the column direction, inverting the polarity every column is more preferred than every row. Herein, the drive method involving controlling the polarity of the voltage applied to the first electrode is called "inversion drive", in which the case that any adjacent pixels in a row are of opposite polarity is called column inversion, the case that any adjacent pixels in a column are of opposite polarity is called row inversion, and the case that any adjacent pixels both in a row and in a column are of opposite polarity is called dot inversion.

In the liquid crystal display device of the present invention described above, the openings formed in the first electrode (for example, a pixel electrode) and/or the second electrode (for example, a counter electrode) act to fix the position of the center axis of the axisymmetric alignment, to thereby stabilize the alignment of the axisymmetrically aligned domain. In the case of forming a plurality of axisymmetrically aligned domains in each pixel, a cut may be formed in the first electrode. An inclined electric field is generated near such a cut and serves to define the directions in which liquid crystal molecules fall. Thus, the axisymmetrically aligned domain is further stabilized.

The center axis of the axisymmetric alignment of the liquid crystal domain can be fixed further stably by placing the first opening and the second opening (pair of openings) so that one end of the center axis of the axisymmetric alignment is fixed in or near the first opening and the other end thereof is fixed in or near the second opening. The reduction in effective aperture ratio due to the existence of the openings can be minimized by placing the first opening and the second opening (pair of openings) so as to at least overlap each other via the liquid crystal layer. Since one center axis is fixed/stabilized with the joint action of the first opening and the second opening, the action exerted by the individual first or second opening can be small compared with the case of fixing/stabilizing the center axis with one opening. It is therefore possible to reduce the size of the first and second openings (for example, the diameter of circular openings), and as a result, the reduction in effective aperture ratio can be further minimized. The sizes of the first opening and the second opening may be equal to or different from each other. The first and second openings, which are provided for fixing and stabilizing the position of the center axis of the axisymmetric alignment, can be comparatively small in size, and therefore the reduction in aperture ratio due to the formation of the opening is small. Also, the openings are less affected by misalignment that may occur in bonding of the first substrate and the second substrate together.

With the openings provided at positions corresponding to the center axis of the axisymmetrically aligned liquid crystal domain, the position of the center axis is fixed/stabilized. As a result of the fixation of the center axes of the axisymmetrically aligned liquid crystal domains over the entire liquid crystal display panel, the uniformity of the display improves. For example, the roughness of display recognized when grayscale display is viewed in a slanting direction is reduced. Also, as a result of the stabilization of the axisymmetric alignment, the response time in grayscale display can be shortened. Moreover, the time required to resume normal alignment from an alignment distortion occurring when the liquid crystal display panel is pressed (an afterimage due to pressing) can be shortened.

When the present invention is applied to a transflective LCD device, a transparent dielectric layer may be placed on the second substrate for control of the thickness of the liquid crystal layer. With this construction, an invalid region that does not contribute to display during transmission display can be reduced compared with the conventional transflective LCD device in which the transmission region and the reflection region are differentiated from each other by forming a step on the first substrate, and thus the brightness in transmission display can be improved. The diffuse reflection plate for improving the brightness in the reflection region may be provided on the first substrate in the reflection region. Otherwise, a light scattering layer (light diffuse layer) may be formed on the transparent dielectric layer on the second substrate. This can eliminate the necessity of forming projections and depressions on the surface of the reflection electrode.

In the liquid crystal display device in the second aspect of the present invention, an arbitrary row of pixels among the plurality of pixels includes first pixels each having the first electrode (for example, a pixel electrode) to which a voltage of positive polarity with respect to the potential at the second electrode (for example, a counter electrode) as the reference potential is supplied and second pixels each having the first electrode to which a voltage of negative polarity is supplied, arranged alternately, during a given vertical scanning period. Accordingly, a steeply inclined electric field is generated between the first pixel and the second pixel, and with this inclined electric field, an axisymmetrically aligned domain is formed.

In the liquid crystal display device of the present invention described above, an inclined electric field generated near the openings formed in the first electrode (for example, a pixel electrode) and/or the second electrode (for example, a counter electrode) acts to fix the position of the center axis of the axisymmetric alignment, and also stabilizes the alignment of the axisymmetrically aligned domain in cooperation with the steeply inclined electric field generated between adjacent pixels. In the case of forming a plurality of axisymmetrically aligned domains in each pixel, a cut may be formed in the first electrode. An inclined electric field is generated near such a cut and serves to define the directions in which liquid crystal molecules fall. Thus, the axisymmetrically aligned domain is further stabilized.

The center axis of the axisymmetric alignment of the liquid crystal domain can be fixed further stably by placing the first opening and the second opening (pair of openings) so that one end of the center axis of the axisymmetric alignment is fixed in or near the first opening and the other end thereof is fixed in or near the second opening. The reduction in effective aperture ratio due to the existence of the openings can be minimized by placing the first opening and the second opening (pair of openings) so as to at least overlap each other via the liquid crystal layer. Since one center axis is fixed/stabilized with the joint action of the first opening and the second opening, the action exerted by the individual first or second opening can be small compared with the case of fixing/stabilizing the center axis with one opening. It is therefore possible to reduce the size of the first and second openings (for example, the diameter of circular openings), and as a result, the reduction in effective aperture ratio can be further minimized. The sizes of the first opening and the second opening may be equal to or different from each other. The first and second openings, which are provided for fixing and stabilizing the position of the center axis of the axisymmetric alignment, can be comparatively small in size, and therefore the reduction in aperture ratio due to the formation of the opening is small. Also, the openings are less affected by misalignment that may occur in bonding of the first substrate and the second substrate together.

With the openings provided at positions corresponding to the center axis of the axisymmetrically aligned liquid crystal domain, the position of the center axis is fixed/stabilized. As a result of the fixation of the center axes of the axisymmetrically aligned liquid crystal domains over the entire liquid crystal display panel, the uniformity of the display improves. For example, the roughness of display recognized when grayscale display is viewed in a slanting direction is reduced. Also, as a result of the stabilization of the axisymmetric alignment, the response time in grayscale display can be shortened. Moreover, the time required to resume normal alignment from an alignment distortion occurring when the liquid crystal display panel is pressed (an afterimage due to pressing) can be shortened.

When a wall structure is formed on the surface of the first substrate in the shading region, the directions in which liquid crystal molecules tilt during voltage application (during generation of an electric field) are defined with the slope face effect of the wall structure, and this further stabilizes the axisymmetrically aligned domain. The inclined electric field generated by applying voltages of opposite polarity to the first electrodes of pixels adjacent to each other acts, together with the alignment regulating force of the side slopes of the wall structure provided between the adjacent pixels and the effect of distortion of the electric field due to the existence of the wall structure, to stabilize the alignment of the axisymmetric domain. The alignment regulating force of the side slopes of the wall structure acts irrespective of generation of the electric field, and the electric field is distorted with the existence of the wall structure. Therefore, the axisymmetric alignment can be stabilized even in a grayscale display state. This further shortens the time required to resume normal alignment from an alignment distortion occurring when the liquid crystal display panel is pressed.

Moreover, in the LCD device of the present invention described above, switching elements connected to one arbitrary scanning signal line include switching elements connected to first electrodes belonging to one of a pair of rows adjacent to the scanning signal line and switching elements connected to first electrodes belonging to the other row alternately. In other words, the switching elements (and the pixel electrodes connected via the switching elements) connected to a given scanning signal line are placed on the upper and lower sides of the scanning signal line alternately in a zigzag fashion. Accordingly, by performing the conventional one-line inversion drive (1H inversion drive), display signals of opposite polarity with respect to the second electrode (counter electrode) as the reference can resultantly be applied across portions of the liquid crystal layer in adjacent pixels both in the row and column directions (1H dot inversion drive).

When the present invention is applied to a transflective LCD device, a transparent dielectric layer may be placed on the second substrate for control of the thickness of the liquid crystal layer. With this construction, an invalid region that does not contribute to display during transmission display can be reduced compared with the conventional transflective LCD device in which the transmission region and the reflection region are differentiated from each other by forming a step on the first substrate, and thus the brightness in transmission display can be improved. The diffuse reflection plate for improving the brightness in the reflection region may be provided on the first substrate in the reflection region. Otherwise, a light scattering layer (light diffuse layer) may be formed on the transparent dielectric layer on the second substrate. This can eliminate the necessity of forming projections and depressions on the surface of the reflection electrode.

BRIEF DESCRIPTION OF THE DRAWINGS

FIGS. 1A and 1B diagrammatically show one pixel of a transmissive LCD device 100 of an embodiment of the present invention, in which FIG. 1A is a plan view and FIG. 1B is a cross-sectional view taken along line 1B-1B' in FIG. 1A.

FIGS. 2A and 2B diagrammatically show one pixel of a transflective LCD device 200 of an embodiment of the present invention, in which FIG. 2A is a plan view and FIG. 2B is a cross-sectional view taken along line 2B-2B' in FIG. 2A.

DETAILED DESCRIPTION OF THE INVENTION

EMBODIMENT 1

Figure 1A:
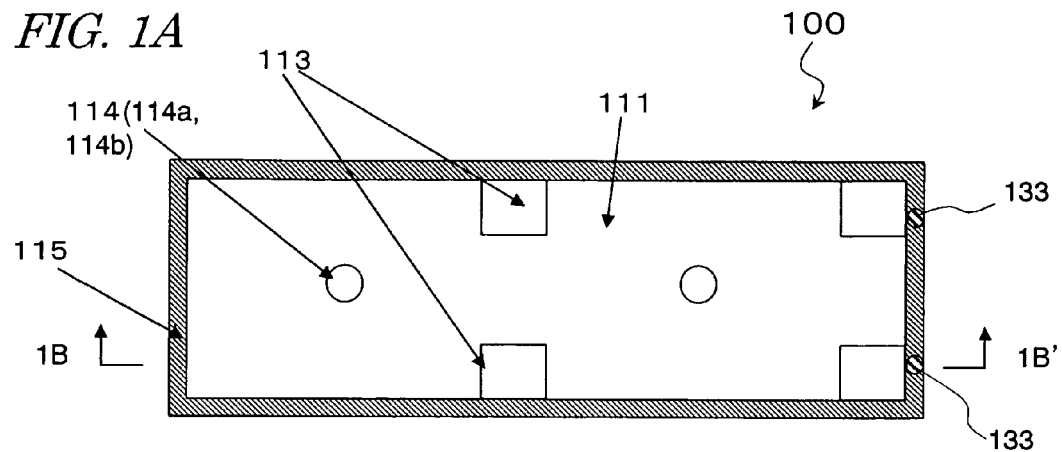

Hereinafter, LCD devices of Embodiment 1 of the present invention will be described concretely with reference to FIGS. 1A/B to 4, 5A and 6 to 11.

(Transmissive LCD Device)

A transmissive LCD device 100 of Embodiment 1 of the present invention will be described with reference to FIGS. 1A and 1B. FIGS. 1A and 1B diagrammatically show one pixel of the transmissive LCD device 100, in which FIG. 1A is a plan view and FIG. 1B is a cross-sectional view taken along line 1B-1B' in FIG. 1A.

Hereinafter, described will be the case that one pixel is divided into two parts (N=2). The number of parts into which one pixel is divided (=N) can also be three or more depending on the pixel pitch. In any case, the number of openings (=n) each to be positioned roughly in the center of a divided region on a second substrate is preferably the same as the number of divided parts (=N). The effective aperture ratio tends to decrease with increase of the number of divided parts (=N). Therefore, for an application to a high-definition display panel, the number of divided parts (=N) is preferably made small. The present invention is also applicable to the case involving no pixel division (this may be expressed as N=1). Each of the divided regions may be called a "sub-pixel". One liquid crystal domain is typically formed in each sub-pixel.

The LCD device 100 includes a transparent substrate (for example, a glass substrate) 110a, a transparent substrate 110b placed to face the transparent substrate 110a, and a vertically aligned liquid crystal layer 120 interposed between the transparent substrates 110a and 110b. Vertical alignment films (not shown) are formed on the surfaces of the substrates 110a and 110b facing the liquid crystal layer 120. During non-voltage application, therefore, liquid crystal molecules in the liquid crystal layer 120 are aligned roughly vertical to the surfaces of the vertical alignment films. The liquid crystal layer 120 includes a nematic liquid crystal material having negative dielectric anisotropy and also includes a chiral agent as required.

The LCD device 100 further includes pixel electrodes 111 formed on the transparent substrate 110a and a counter electrode 131 formed on the transparent substrate 110b. Each pixel electrode 111, the counter electrode 131 and the liquid crystal layer 120 interposed between these electrodes define a pixel. In the illustrated example, both the pixel electrodes 111 and the counter electrode 131 are formed of a transparent conductive layer (for example, an ITO layer). Typically, color filters 130 (the entire of the plurality of color filters may also be called a color filter layer 130) provided for the respective pixels, as well as a black matrix (shading layer) 132 formed in the gaps between the adjacent color filters 130, are formed on the surface of the transparent substrate 110b facing the liquid crystal layer 120, and the counter electrode 131 is formed on the color filters 130 and the black matrix 132. Alternatively, the color filters 130 and the black matrix 132 may be formed on the counter electrode 131 (on the surface thereof facing the liquid crystal layer 120).

In the LCD device 100 shown in FIGS. 1A and 1B, in which the number of divided parts (=N) is 2, a wall structure 115 to be described later extends on the transparent substrate 110a in a shading region around the pixel electrodes 111. Each pixel electrode 111 has first openings 114a of the number corresponding to the number of divided parts (n=2 in the illustrated example) at predetermined positions in the pixel. The pixel electrode 111 also has four cuts 113 at predetermined positions. On the transparent substrate 110b, the counter electrode 131 of each pixel has second openings 114b of the number corresponding to the number of divided parts (n=2 in the illustrated example) at predetermined positions.

The first openings 114a and the second openings 114b are formed so that they are superposed one on the other spatially via the liquid crystal layer 120. The first openings 114a and the second openings 114b have the same size (diameter), and each pair of the first and second openings 1114a and 1114b facing each other (which are called a pair of openings 114 in some cases) coincide with each other when viewed from top as shown in FIG. 1A.

When a predetermined voltage is applied across the liquid crystal layer, two (number equal to the number of divided parts N) liquid crystal domains each having axisymmetric alignment are formed, with the center axes of the axisymmetric alignment thereof being in or near the first and second openings 114a and 114b. As will be described later in detail, the pairs of openings 114 act to fix the positions of the center axes of the axisymmetrically aligned domains. With the placement of the first opening 114a and the second opening 114b to be superposed one on the other as in the illustrated example, the reduction in effective aperture ratio due to the existence of the pair of openings 114 can be minimized. Since one center axis is fixed/stabilized with the joint action of the first opening 114a and the second opening 114b, the action exerted by the individual first or second opening 114a or 114b can be small compared with the case of fixing/stabilizing the center axis with one opening. It is therefore possible to reduce the diameter of the first and second openings 114a and 114b, and as a result, the reduction in effective aperture ratio can be minimized.

The wall structure 115 acts to define the directions in which liquid crystal molecules fall during voltage application (during generation of an electric field) with its slope face effect. The alignment regulating force of the side slopes of the wall structure 115 acts also during non-voltage application to tilt liquid crystal molecules. As will be described later in detail, in the LCD device of this embodiment of the present invention, voltage application for pixels arranged in a matrix having rows and columns is made so that the voltages applied to the pixel electrodes in adjacent pixels are of opposite polarity with respect to the voltage applied to the counter electrode 131 as the reference in both column and row directions in each vertical scanning period (dot inversion drive). With this drive, a steeply inclined electric field is generated between the adjacent pixels, acting to stabilize the axisymmetric alignment. The electric field generated between the pixels is distorted with the wall structure 115 existing between the adjacent pixels, and acts to define the directions in which liquid crystal molecules tilt near the wall faces of the wall structure 215. These effects act cooperatively, to stabilize the axisymmetric alignment. When the grayscale level difference between the adjacent pixels is small in a grayscale display state, sufficient alignment stabilizing effect may not be obtained with only the inclined electric field generated by adopting the dot inversion drive as described in Literature 7. With the joint use of the wall face effect of the wall structure 115, the axisymmetric alignment can be sufficiently stabilized even in a grayscale display state. The dot inversion drive is preferably adopted because, with this drive, the alignment stabilizing effect given with the inclined electric field generated between the adjacent pixels can be obtained on four sides of each pixel having a roughly rectangular shape. Alternatively, row inversion drive or column inversion drive may be adopted to obtain at least the alignment stabilizing effect given with the inclined electric field generated between the adjacent pixels in the column or row direction.

The cuts 113, provided in the pixel electrode 111 near the boundaries of the axisymmetrically aligned domains, define the directions in which liquid crystal molecules fall with an electric field, and thus act to form the axisymmetrically aligned domains. An inclined electric field is generated around the pairs of openings 114 and the cuts 113 with a voltage applied between the pixel electrode 111 and the counter electrode 113. With this inclined electric field, together with the action of the electric field at the wall faces of the wall structure 115 distorted with the existence of the wall structure 115, the directions of tilt of liquid crystal molecules are defined, resulting in formation of the axisymmetric alignment as described above. In the illustrated example, a total of four cuts 113 are given point-symmetrically with respect to the pair of openings 114 corresponding to the center axis of a liquid crystal domain formed in the pixel (in this case, the right opening as viewed from FIG. 1A) (in this case, the entire pixel is a transmission region).

By providing the cuts 113 as described above, the directions in which liquid crystal molecules fall during voltage application are defined, allowing formation of two liquid crystal domains. The reason why no cuts are provided on the left side of the pixel electrode 111 as viewed from FIG. 1A is that substantially the same function is obtained from cuts provided on the right side of the adjacent pixel electrode (not shown) located left to the illustrated pixel electrode 111, and thus cuts, which may decrease the effective aperture ratio of the pixel, are omitted on the left side of the pixel electrode 111. Also, in the illustrated example, the wall structure 115 to be described later gives the alignment regulating force. Therefore, with no cuts provided on the left side of the pixel electrode 111, the resultant liquid crystal domain is as stable as a liquid crystal domain having such cuts. In addition, the effect of improving the effective aperture ratio is obtained.

Although a total of four cuts 113 were formed in the illustrated example, at least one cut between the adjacent liquid crystal domains is sufficient. For example, an elongate cut may be formed in the center of the pixel and the other cuts may be omitted.

The shape of the first and second openings 114a and 114b formed at predetermined positions of the pixel electrode 111 and the counter electrode 131 to fix the center axes of the axisymmetrically aligned domains is preferably circular as illustrated. The shape is not limited to a circle, and also the shape of the first openings 114a may be different from the shape of the second openings 114b. However, to exert roughly equal alignment regulating force in all directions, the shape is preferably a polygon having four or more sides and also preferably a regular polygon.

Although openings were placed in both the pixel electrode 111 and the counter electrode 131 in the illustrated example, the effect of stabilizing the center axis of the axisymmetric alignment can also be obtained by placing an opening only on one of the substrates. The configuration and placement of the first opening 114a and the second opening 114b are not limited to the illustrated example in which the first opening 114a and the second opening 114b having the same size are superposed one on the other. The first and second openings 114a and 114b can separately provide the effect of fixing/stabilizing the axisymmetric alignment even when they are not superposed one on the other. However, the fixation of the center axis of the axisymmetric alignment will be further stabilized if the placement is made so that the first opening 114a fixes one end of the center axis of the axisymmetric alignment of the liquid crystal domain and the second opening 114b fixes the other end of the center axis. Also, the reduction in effective aperture ratio due to the existence of the openings 114 will be lessened if the first and second openings 114a and 114b are placed to at least overlap each other via the liquid crystal layer. In this case, since one center axis is fixed/stabilized with the joint action of the first and second openings, the action to be exerted by the individual first or second opening 114a or 114b can be small compared with the case of fixing/stabilizing the center axis with one opening, and by superposing the first opening 114a and the second opening 114b having the same size one on the other as in the illustrated example, the reduction in effective aperture ratio can be minimized.

The shape of the cuts 113 acting to define the directions in which liquid crystal molecules in the axisymmetrically aligned domains fall with the electric field is determined so that roughly equal alignment regulating force is exerted for the adjacent axisymmetrically aligned domains. For example, a square is preferred. The cuts may be omitted.

The LCD device 100 has a shading region surrounding each of the pixels, and the wall structure 115 is placed on the transparent substrate 110a in the shading region. The shading region as used herein refers to a region shaded from light due to the presence of TFTs, gate signal lines and source signal lines formed on the peripheries of the pixel electrodes 111 on the transparent substrate 110a, or the presence of the black matrix formed on the transparent substrate 110b, for example. Since this region does not contribute to display, the wall structure 115 formed in the shading region is free from adversely affecting the display.

The illustrated wall structure 115 is a continuous wall surrounding the pixel. Alternatively, the wall structure 115 may be composed of a plurality of separate walls. The wall structure 115, which serves to define boundaries of liquid crystal domains located near the outer edges of the pixel, should preferably have a length of some extent. For example, when the wall structure is composed of a plurality of walls, each wall is preferably longer than the gap between the adjacent walls.

Supports 133 for defining the thickness of the liquid crystal layer 120 (also called the cell gap) are preferably formed in the shading region (in the illustrated example, the region defined by the black matrix 132) to avoid degradation in display quality due to the supports. Although the supports 133 are formed on the wall structure 115 provided in the shading region in the illustrated example, the supports 133 may be formed on either transparent substrate 110a or 110b. In the case of forming the supports 133 on the wall structure 115, setting is made so that the sum of the height of the wall structure 115 and the height of the supports 133 is equal to the thickness of the liquid crystal layer 120. If the supports 133 are formed in a region having no wall structure 115, setting is made so that the height of the supports 133 is equal to the thickness of the liquid crystal layer 120. The supports 133 can be formed by photolithography using a photosensitive resin, for example.

In the LCD device 100, when a predetermined voltage (voltage equal to or higher than a threshold voltage) is applied between the pixel electrode 111 and the counter electrode 131, the electric field distorted with the wall faces of the wall structure 115 and the wall face effect of the wall structure 115 mainly define the directions in which liquid crystal molecules in the two adjacent liquid crystal domains fall with an electric field. Also, the inclined electric field generated near the pair of cuts 133 acts to define the directions in which liquid crystal molecules in the two adjacent liquid crystal domains fall with an electric field. Such alignment regulating forces act cooperatively, to stabilize the axisymmetric alignment of the liquid crystal domains even in a grayscale display state. In addition, the action of the inclined electric field generated between the adjacent pixels by adopting the dot inversion drive is also effective in stabilizing the axisymmetric alignment. Moreover, the center axes of the two axisymmetrically aligned domains are fixed/stabilized in or near the two pairs of openings 114 formed in the pixel electrode 111 and the counter electrode 131.

With the pairs of openings 114 formed at positions in the pixel electrode 111 and the counter electrode 131 corresponding to the center axes of the axisymmetrically aligned liquid crystal domains, the positions of the center axes are fixed/stabilized. As a result of the fixation of the center axes of the axisymmetrically aligned liquid crystal domains over the entire liquid crystal display panel, the uniformity of the display improves. Also, as a result of the stabilization of the axisymmetric alignment, the response time in grayscale display can be shortened. Moreover, occurrence of an afterimage due to pressing of the liquid crystal display panel can be reduced (the time required to resume from the pressing can be shortened).

On the surface of the transparent substrate 110a facing the liquid crystal layer 120, provided are active elements such as TFTs and circuit elements such as gate signal lines and source signal lines connected to TFTs (all of these elements are not shown). Herein, the transparent substrate 110a, together with the circuit elements and the pixel electrodes 111, the wall structure 115, the supports 133, the alignment film and the like described above formed on the transparent substrate 110a, are collectively called an active matrix substrate in some cases. Likewise, the transparent substrate 110b, together with the color filter layer 130, the black matrix 132, the counter electrode 131, the alignment film and the like formed on the transparent substrate 110b, are collectively called a counter substrate or a color filter substrate in some cases. The supports 133 may be formed either on the active matrix substrate or on the color filter substrate.

Although omitted in the above description, the LCD device 100 further includes a pair of polarizing plates placed to face each other via the transparent substrates 110a and 110b. The polarizing plates are typically placed so that their transmission axes are orthogonal to each other. The LCD device 100 may further include a biaxial optical anisotropic medium layer and/or a uniaxial optical anisotropic medium layer, as will be described later.

(Transflective LCD Device)

Next, a transflective LCD device 200 of Embodiment 1 of the present invention will be described with reference to FIGS. 2A and 2B.

Figure 2A:
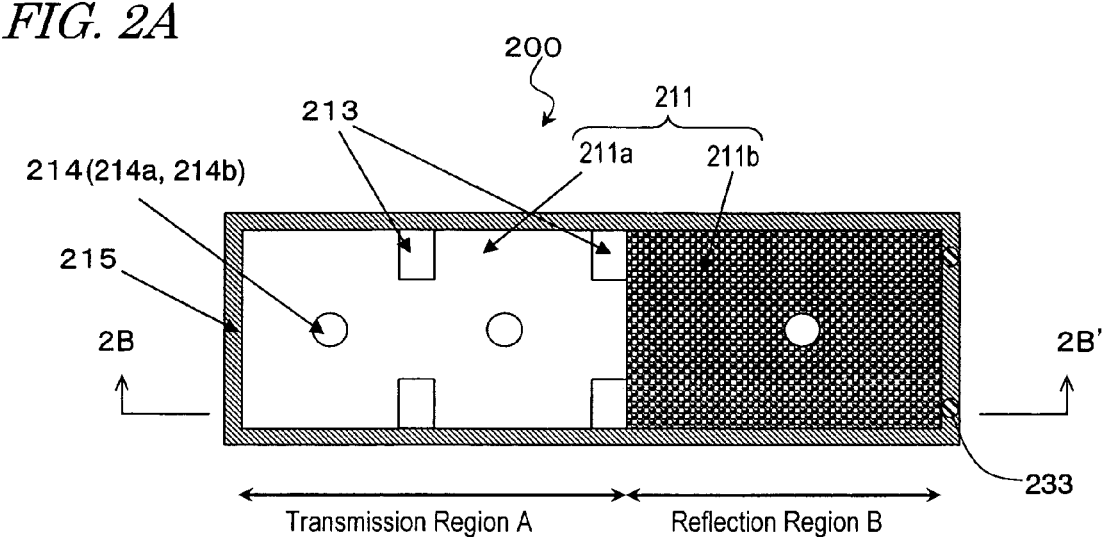
Figure 2B:
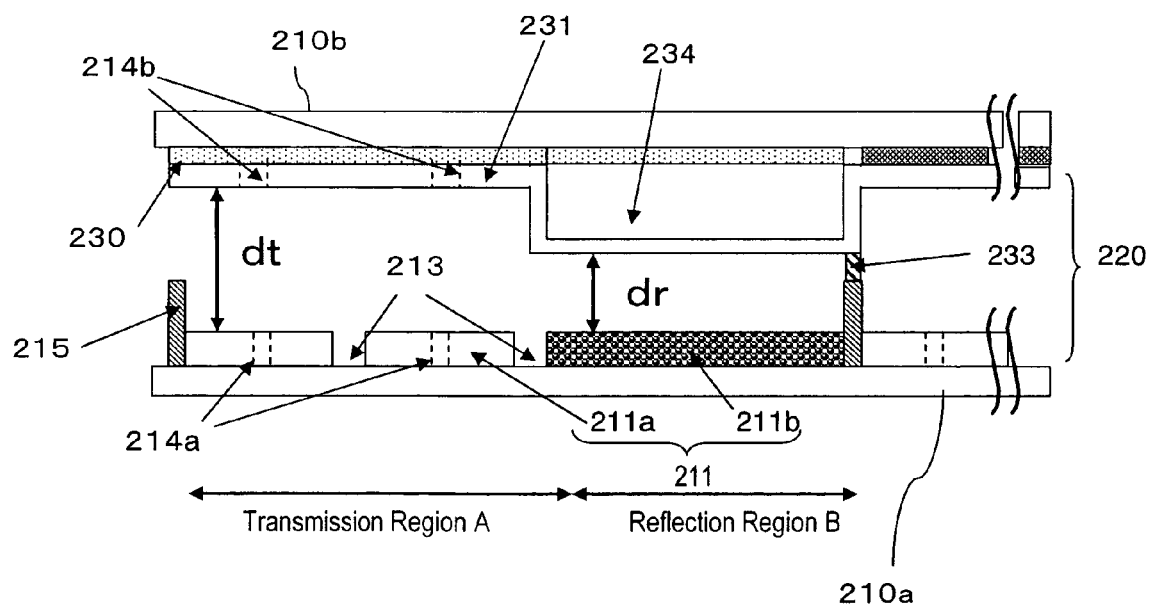

FIGS. 2A and 2B diagrammatically show one pixel of the transflective LCD device 200 of Embodiment 1 of the present invention, in which FIG. 2A is a plan view and FIG. 2B is a cross-sectional view taken along line 2B-2B' in FIG. 2A.

Hereinafter, described will be a case that one pixel is divided into three parts (N=3; two for the transmission region and one for the reflection region). The number of parts into which one pixel is divided (=N) can be at least two (at least one for the transmission region and at least one for the reflection region) determined depending on the pixel pitch. The number of openings (=n) each to be positioned roughly in the center of a divided region (region in which an axisymmetrically aligned domain is formed) on the counter substrate (second substrate) is preferably the same as the number of divided parts (=N). Note however that if a transparent dielectric layer is selectively formed on the surface of the counter substrate facing the liquid crystal layer in the reflection region, to be described later, no opening may be formed in the counter electrode (second electrode) in the reflection region. The effective aperture ratio tends to decrease with increase of the number of divided parts (=N). Therefore, for an application to a high-definition display panel, the number of divided parts (=N) is preferably made small.

The LCD device 200 includes a transparent substrate (for example, a glass substrate) 210a, a transparent substrate 210b placed to face the transparent substrate 210a, and a vertically aligned liquid crystal layer 220 interposed between the transparent substrates 210a and 210b. Vertical alignment films (not shown) are formed on the surfaces of the substrates 210a and 210b facing the liquid crystal layer 220. During non-voltage application, therefore, liquid crystal molecules in the liquid crystal layer 220 are aligned roughly vertical to the surfaces of the vertical alignment films. The liquid crystal layer 220 includes a nematic liquid crystal material having negative dielectric anisotropy and also includes a chiral agent as required.

The LCD device 200 further includes pixel electrodes 211 formed on the transparent substrate 210a and a counter electrode 231 formed on the transparent substrate 210b. Each pixel electrode 211, the counter electrode 231 and the liquid crystal layer 220 interposed between these electrodes define a pixel. Circuit elements such as TFTs are formed on the transparent substrate 210a as will be described later. Herein, the transparent substrate 210a and the components formed thereon are collectively called an active matrix substrate 210a in some cases.

Typically, color filters 230 (the entire of the plurality of color filters may also be called a color filter layer 230) provided for the respective pixels, as well as a black matrix (shading layer) 232 provided in the gaps between the adjacent color filters 230, are formed on the surface of the transparent substrate 210b facing the liquid crystal layer 2220, and the counter electrode 231 is formed on the color filters 230 and the black matrix 232. Alternatively, the color filters 230 and the black matrix 232 may be formed on the counter electrode 231 (on the surface thereof facing the liquid crystal layer 220). Herein, the transparent substrate 210b and the components formed thereon are collectively called a counter substrate (color filter substrate) 210b in some cases.

Each pixel electrode 211 includes a transparent electrode 211a formed of a transparent conductive layer (for example, an ITO layer) and a reflective electrode 211b formed of a metal layer (for example, an Al layer, an Al-including alloy layer, and a multilayer film including any of these layers). Having such a pixel electrode, each pixel includes a transmission region A defined by the transparent electrode 211a and a reflection region B defined by the reflective electrode 211b, to provide display in the transmission mode and display in the reflection mode, respectively.

In the LCD device 200 shown in FIGS. 2A and 2B, in which the number of divided parts (=N) is 3 (two for the transmission region and one for the reflection region), a wall structure 215 to be described later extends on the transparent substrate 210a in a shading region around each pixel electrode 211. The pixel electrode 211 has first openings 214a of the number corresponding to the number of divided parts (n=3 in the illustrated example) at predetermined positions in the pixel. The pixel electrode 211 also has four cuts 213 at predetermined positions. On the transparent substrate 210b, the counter electrode 231 of each pixel has two second openings 214b corresponding to the number of divided parts in the transmission region.

When a predetermined voltage is applied across the liquid crystal layer, three (number equal to the number of divided parts N) liquid crystal domains each having axisymmetric alignment are formed, with the center axes of the axisymmetric alignment of the liquid crystal domains being in or near the first and second openings 214a and 214b. As will be described later, the openings 214a and 214b formed at predetermined positions of the pixel electrode 211 and the counter electrode 231 act to fix the positions of the center axes of the axisymmetric alignment. The first opening 214a and the second opening 214b may be placed to be superposed one on the other in the transmission region as in the illustrated example. With this placement, the reduction in effective aperture ratio due to the existence of the pair of openings 214 can be minimized. Since one center axis is fixed/stabilized with the joint action of the first and second openings, the action exerted by the individual first or second opening 214a or 214b can be small compared with the case of fixing/stabilizing the center axis with one opening. It is therefore possible to reduce the diameter of the first and second openings 214a and 214b, and as a result, the reduction in effective aperture ratio can be minimized.

The wall structure 215 acts to define the directions in which liquid crystal molecules tilt during voltage application (during generation of an electric field) with its slope face effect. As will be described later in detail, in the LCD device of Embodiment 1 of the present invention, voltage application for pixels arranged in a matrix having rows and columns is made so that the voltages applied to the pixel electrodes in adjacent pixels are of opposite polarity with respect to the voltage applied to the counter electrode 231 as the reference in both column and row directions in each vertical scanning period (dot inversion drive). With this drive, a steeply inclined electric field is generated between the adjacent pixels, and acts to stabilize the axisymmetric alignment. Also, the electric field generated between the pixels is distorted with the wall structure 215 existing between the adjacent pixels, acting to define the directions in which liquid crystal molecules tilt near the wall faces of the wall structure 215. These effects act cooperatively, to stabilize the axisymmetric alignment. When the grayscale level difference between the adjacent pixels is small in a grayscale display state, sufficient alignment stabilizing effect may not be obtained with only the inclined electric field generated by adopting the dot inversion drive as described in Literature 7. With the joint use of the wall face effect of the wall structure 215, the axisymmetric alignment can be sufficiently stabilized even in a grayscale display state. The dot inversion drive is preferably adopted because, with this drive, the alignment stabilizing effect given with the inclined electric field generated between the adjacent pixels can be obtained on four sides of each pixel having a roughly rectangular shape. Alternatively, row inversion drive or column inversion drive may be adopted to obtain at least the alignment stabilizing effect given with the inclined electric field generated between the adjacent pixels in the column or row direction.

Moreover, the cuts 213, which are formed as required near a boundary between axisymmetrically aligned domains, act to define the directions in which liquid crystal molecules tilt with an electric field, to form the axisymmetrically aligned domains. An inclined electric field is generated around the cuts 213, as in the openings 214a and 214b, with the application of a voltage between the pixel electrode 211 and the counter electrode 213. With this inclined electric field, acting together with an electric field at the wall faces distorted with the wall structure 215, the directions of tilt of liquid crystal molecules are defined, resulting in formation of the axisymmetric alignment as described above.

In the illustrated example, a total of four cuts 213 are given point-symmetrically with respect to the opening 214a corresponding to the center axis of a liquid crystal domain formed in the transmission region A of the pixel (in this case, the right opening in the transmission region A as viewed from FIG. 2A). With these cuts 213, the directions in which liquid crystal molecules fall during voltage application are defined, resulting in formation of three liquid crystal domains. The placement and preferred shapes of the wall structure 215, the openings 214 and the cuts 213 are the same as those described above in relation to the transmissive LCD device 100. In the example illustrated in FIGS. 2A and 2B, the transmission region A has two liquid crystal domains and the reflection region B has one liquid crystal domain. However, the arrangement is not limited to this. Each liquid crystal domain is preferably roughly square in shape from the standpoint of the viewing angle characteristics and the stability of alignment.

The LCD device 200 has a shading region around each pixel, and the wall structure 215 extends on the transparent substrate 210a in the shading region. Since the shading region does not contribute to display, the wall structure 215 formed in the shading region is free from adversely affecting the display. The wall structure 215 shown in the illustrated example is a continuous wall surrounding the pixel. Alternatively, the wall structure 215 may be composed of a plurality of separate walls. The wall structure 215, which serves to define boundaries of liquid crystal domains located near the outer edges of the pixel, should preferably have a length of some extent. For example, when the wall structure 215 is composed of a plurality of walls, each wall is preferably longer than the gap between the adjacent walls.

Supports 233 for defining the thickness of the liquid crystal layer 220 (also called the cell gap) should preferably be formed in the shading region (in the illustrated example, the region defined by the black matrix 232) to avoid degradation of the display quality due to the supports. Although the supports 233 are formed on the wall structure 215 provided in the shading region in the illustrated example, the supports 233 may be formed on either transparent substrate 210a or 210b. In the case of forming the supports 233 on the wall structure 215, setting is made so that the sum of the height of the wall structure 215 and the height of the supports 233 is equal to the thickness of the liquid crystal layer 220. If the supports 233 are formed in a region having no wall structure 215, setting is made so that the height of the supports 233 is equal to the thickness of the liquid crystal layer 220.

In the LCD device 200, when a predetermined voltage (voltage equal to or higher than a threshold voltage) is applied between the pixel electrode 211 and the counter electrode 231, two axisymmetrically aligned domains are formed in the transmission region A, and one axisymmetrically aligned domain is formed in the reflection region B. The electric field distorted with the wall faces of the wall structure 215 and the wall face effect of the wall structure 215 mainly define the directions in which liquid crystal molecules in the three adjacent liquid crystal domains (two in the transmission region and one in the reflection region) fall with an electric field. Also, the inclined electric field generated near the four cuts 233 acts to define the directions in which liquid crystal molecules in the three adjacent liquid crystal domains fall with the electric field. Such alignment regulating forces act cooperatively, to stabilize the axisymmetric alignment of the liquid crystal domains. Moreover, the center axes of the two axisymmetrically aligned liquid crystal domains formed in the transmission region A are fixed in or near the pairs of openings 214 (each composed of the openings 214a and 214b facing each other) and stabilized. The center axis of the one axisymmetrically aligned liquid crystal domain formed in the reflection region B is stabilized with the opening 214a.

A preferred construction specific to the transflective LCD device 200 permitting both the transmission-mode display and the reflection-mode display will be described.

While light used for display passes through the liquid crystal layer 220 once in the transmission-mode display, it passes through the liquid crystal layer 220 twice in the reflection-mode display. Accordingly, as diagrammatically shown in FIG. 2B, the thickness dt of the liquid crystal layer 220 in the transmission region A is preferably set roughly double the thickness dr of the liquid crystal layer 220 in the reflection region B. By setting in this way, the retardation given to the light by the liquid crystal layer 220 can be roughly the same in both display modes. Most preferably, dr=0.5dt should be satisfied, but good display is secured in both display modes as long as 0.3dt<dr<0.7dt is satisfied. Naturally, dt=dr may be satisfied depending on the use.

In the LCD device 200, a transparent dielectric layer 234 is provided on the glass substrate 210b only in the reflection region B to make the thickness of the liquid crystal layer 220 in the reflection region B smaller than that in the transmission region A. This construction eliminates the necessity of providing a step by forming an insulating film and the like under the reflective electrode 211b, and thus has an advantage of simplifying the fabrication of the active matrix substrate 210a. If the reflective electrode 211b is formed on such an insulting film provided to give a step for adjusting the thickness of the liquid crystal layer 220, light used for transmission display will be shaded with the reflective electrode covering a slope (tapered face) of the insulating film, or light reflected from the reflective electrode formed on a slope of the insulating film will repeat internal reflection, failing to be effectively used even for reflection display. By adopting the construction described above, occurrence of such problems is prevented, and thus the light use efficiency can be improved.

If the transparent dielectric layer 234 is provided with a function of scattering light (diffuse reflection function), white display close to good paper white can be realized without the necessity of providing the reflective electrode 211b with the diffuse reflection function. Such white display close to paper white can also be realized by making the surface of the reflective electrode 211b uneven, and in this case, no light scattering function is necessary for the transparent dielectric layer 234. However, the uneven surface may fail to stabilize the position of the center axis of the axisymmetric alignment depending on the shape of the uneven surface. On the contrary, by combining the transparent dielectric layer 234 having the light scattering function and the reflective electrode 211b having a flat surface, the position of the center axis can be stabilized with the opening 214a formed in the reflective electrode 211b more reliably. Naturally, if the opening 214b is provided in the counter electrode 231 in the reflection region B, the center axis of the axisymmetric alignment will be further stabilized. Note that in the case of making the surface of the reflective electrode 211b uneven to provide the reflective electrode 211b with the diffuse reflection function, the uneven shape is preferably a continuous wave shape to prevent occurrence of an interference color, and such a shape is preferably set to allow stabilization of the center axis of the axisymmetric alignment.

While light used for display passes through the color filter layer 230 once in the transmission mode, it passes through the color filter layer 230 twice in the reflection mode. Accordingly, if the color filter layer 230 has the same optical density both in the transmission region A and the reflection region B, the color purity and/or the luminance may decrease in the reflection mode. To suppress occurrence of this problem, the optical density of the color filter layer in the reflection region is preferably made lower than that in the transmission region. The optical density as used herein is a characteristic value characterizing the color filter layer. For example, the optical density can be reduced by reducing the thickness of the color filter layer. Otherwise, the optical density can be reduced by reducing the density of a pigment added, for example, while keeping the thickness of the color filter layer unchanged. Forming color filter layers different between the transmission region A and the reflection region B in this way will provide a great effect for improvement of the display color reproducibility.

Figure 3:
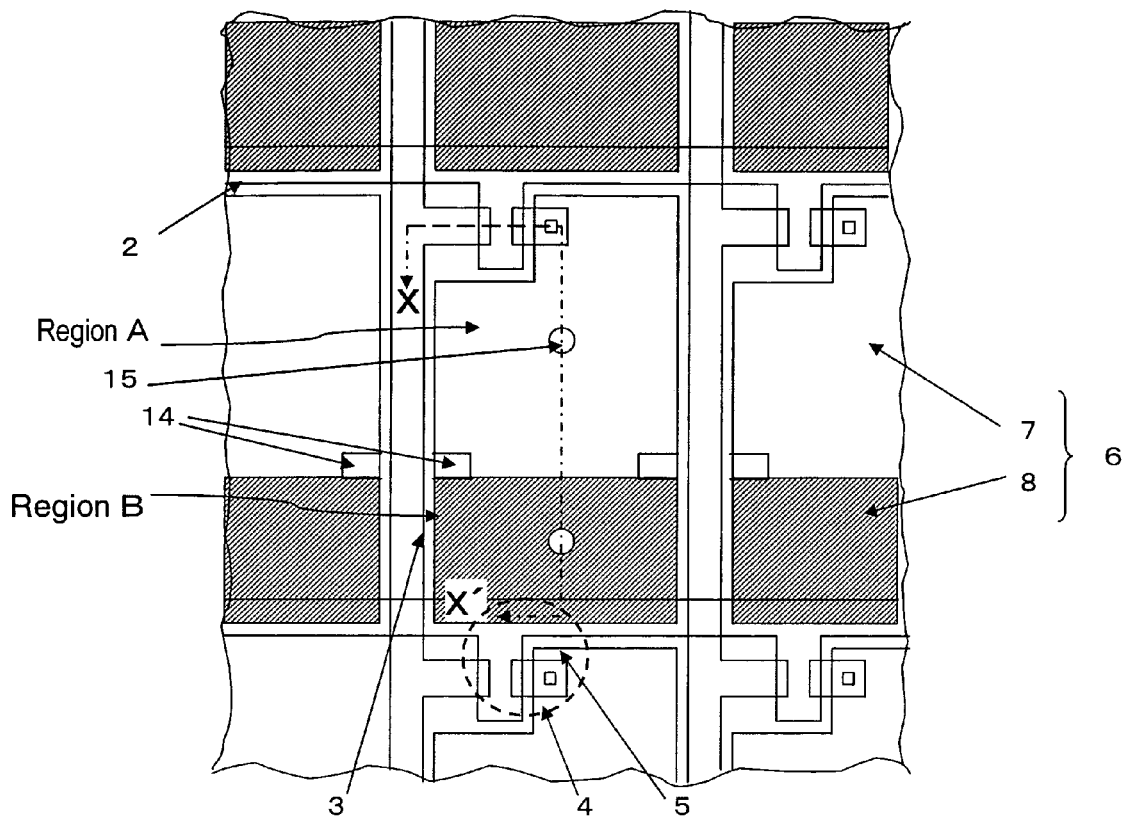
FIG. 3 is a plan view of an active matrix substrate 210a of the transflective LCD device 200.
Figure 4:
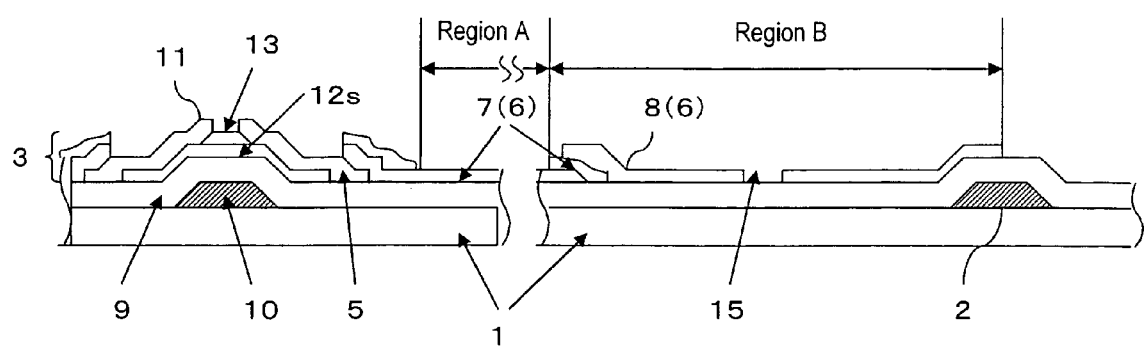
FIG. 4 is a cross-sectional view of the active matrix substrate 210a of the transflective LCD device 200.

Next, referring to FIGS. 3 and 4, an example of the structure of an active matrix substrate suitably used for the transflective LCD device will be described. FIG. 3 is a partial enlarged view of the active matrix substrate, and FIG. 4 is a cross-sectional view taken along line X-X' in FIG. 3. The active matrix substrate shown in FIGS. 3 and 4 can be the same in construction as the active matrix substrate 211a shown in FIGS. 2A and 2B, except that one liquid crystal domain is formed in the transmission region A (that is, the numbers of the openings 214 and the cuts 213 are reduced).

The active matrix substrate shown in FIGS. 3 and 4 has a transparent substrate 1 made of a glass substrate, for example. Gate signal lines 2 and source signal lines 3 run on the transparent substrate 1 to cross each other at right angles. TFTs 4 are formed near the crossings of these signal lines 2 and 3. Drain electrodes 5 of the TFTs 4 are connected to corresponding pixel electrodes 6.

Each of the pixel electrode 6 includes a transparent electrode 7 made of a transparent conductive layer such as an ITO layer and a reflective electrode 8 made of Al and the like. The transparent electrode 7 defines a transmission region A, and the reflective electrode 8 defines a reflection region B. Cuts 14 and the first openings 214 are formed at predetermined positions of the pixel electrode 6 for controlling the alignment of the axisymmetrically aligned domains and for fixing the axis positions of the axisymmetrically aligned domains, respectively, as described above. Also, a wall structure (not shown) is formed in a non-display region outside each pixel (shading region) where signal lines extend, for defining the aligned state of the axisymmetrically aligned domains.

The pixel electrode 6 overlaps the gate signal line for the next row via a gate insulating film 9, forming a storage capacitance. The TFT 4 has a multilayer structure including the gate insulating film 9, a semiconductor layer 12, a channel protection layer 13 and an $n^+$-Si layer 11 (source/drain electrodes) formed in this order on a gate electrode 10 branched from the gate signal line 2.

The illustrated TFT is of a bottom gate type. The TFT is not limited to this type, but a top gate type TFT can also be used.

As described above, in the LCD 200 having the construction shown in FIGS. 2A and 2B, as in the LCD device 100, stable axisymmetrically aligned domains are formed even in a grayscale display state with the existence of the wall structure 215 placed in the shading region and the cuts 213. Also, the axisymmetric alignment is stabilized with the action of the inclined electric field generated between adjacent pixels by adopting the dot inversion drive. Moreover, the center axes of the axisymmetrically aligned liquid crystal domains formed in each pixel are fixed/stabilized with the pairs of openings 214 formed roughly in the center portions of the pixel electrode and the counter electrode. As a result, effects such as reducing the roughness of display observed when grayscale display is viewed in a slanting direction can be obtained. In addition, with the placement of the transparent dielectric layer 234 and/or the color filter 230 in the manner described above, the display brightness and color purity in both the transmission mode and the reflection mode can be improved.

(Alignment Stabilizing Drive Method)

In the LCD devices of Embodiment 1 described above, voltage application for pixels arranged in a matrix having rows and columns is made so that the voltages applied to the pixel electrodes in any adjacent pixels are of opposite polarity with respect to the voltage applied to the counter electrode as the reference in both column and row directions in each vertical scanning period (dot inversion drive). Hereinafter, the alignment stabilizing effect obtained by adopting the dot inversion drive will be described in detail.

Figure 5A:
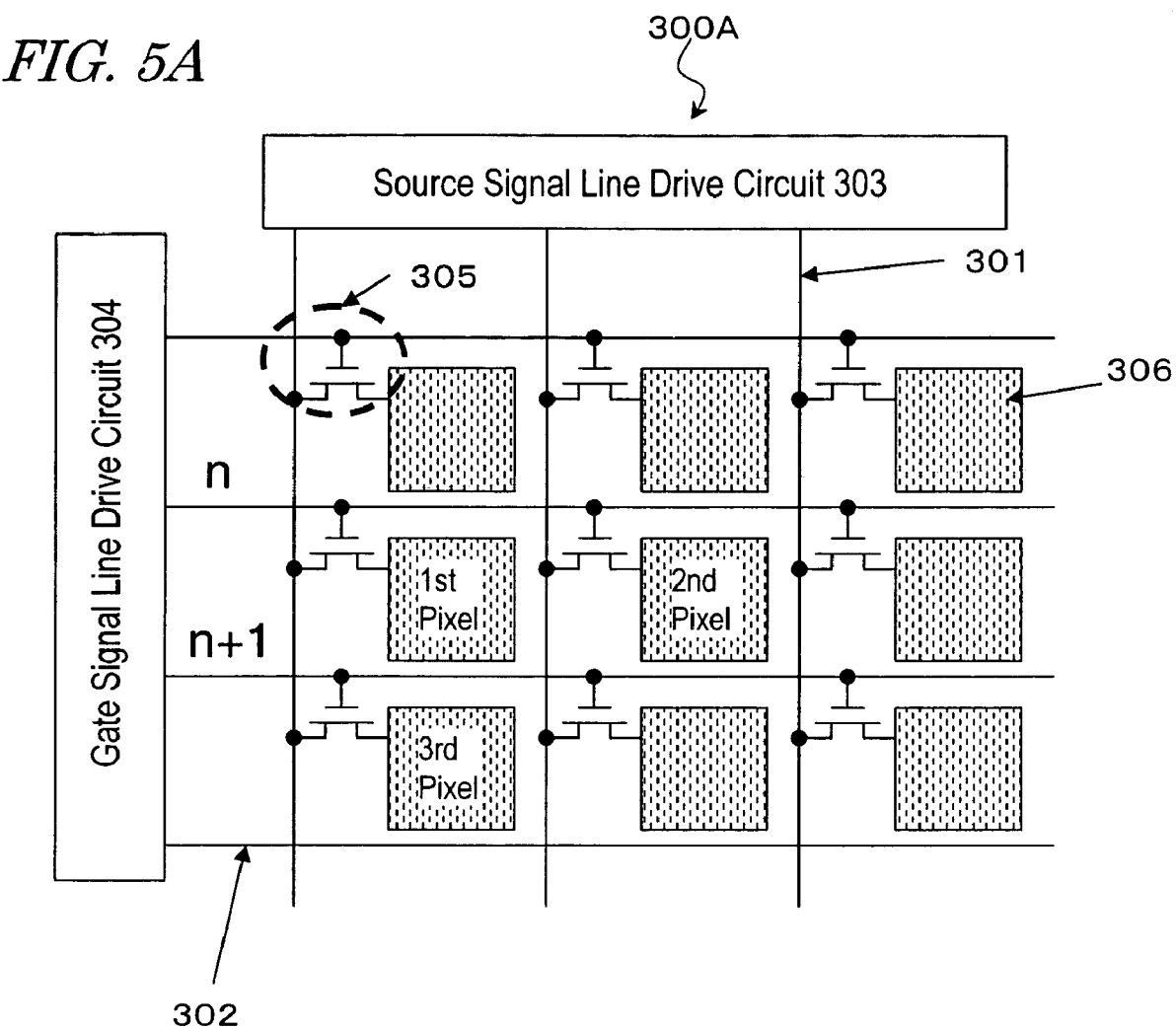
FIG. 5A is a view diagrammatically showing drive circuits and pixel arrangement of an LCD device 300A of Embodiment 1 of the present invention.

FIG. 5A diagrammatically shows drive circuits and the pixel arrangement of an LCD device 300A of Embodiment 1 of the present invention. The display region of the LCD device 300A is the same as that of the LCD device 100 or 200 described above.

The LCD device 300A, which is a TFT-LCD device, has a plurality of data signal lines (source signal lines) 301 extending in parallel with each other in the column direction and a plurality of scanning signal lines (gate signal lines) 302 extending in parallel with each other in the row direction, which are respectively connected to a source signal drive circuit 303 and a gate signal drive circuit 304. The LCD device 300A has at least one TFT 305 for each pixel. The gate electrode and the source electrode of the TFT 305 are respectively connected with the corresponding scanning signal line and the corresponding data signal line. The drain electrode of the TFT 305 is connected with a pixel electrode 306. When a predetermined voltage (scanning signal voltage) is applied to the gate electrode, the TFT 305 is turned ON, electrically connecting the pixel electrode 306 to the data signal line to thereby allow a predetermined data signal voltage to be supplied to the pixel electrode 306. A predetermined common voltage is supplied to a counter electrode (not shown) facing the pixel electrode 306 (typically facing a plurality of pixel electrodes). The difference between the common voltage supplied to the counter electrode and the data signal voltage supplied to the pixel electrode 306 is applied across a liquid crystal layer in each pixel. Voltages of opposite polarity with respect to the voltage supplied to the counter electrode as the reference are supplied to pixel electrodes in every two adjacent pixels in the row and column directions, and the polarity is switched every frame.

Figures 5B, 6:
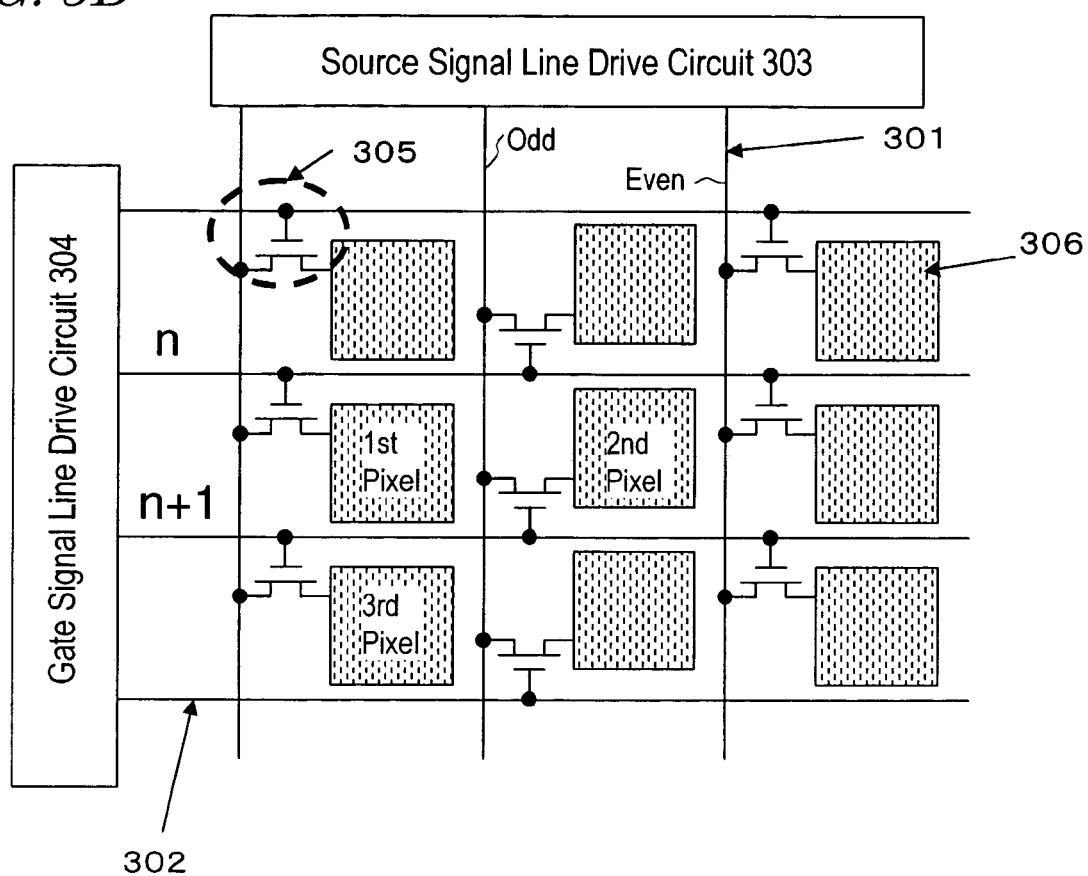
FIG. 5B is a view diagrammatically showing drive circuits and pixel arrangement of an LCD device 300B of Embodiment 2 of the present invention.
FIG. 6 is a view showing an example of polarity pattern of voltages applied to pixels in a given frame period of the LCD devices 300A and 300B.

In this embodiment, within one frame period, a voltage opposite in polarity to a voltage supplied to an arbitrary first pixel in a matrix of pixels with respect to the counter electrode as the reference is supplied to a second pixel that is adjacent to the first pixel and connected to the scanning signal line of the same row (n-th row) as the first pixel, and also a voltage opposite in polarity to the voltage supplied to the first pixel with respect to the counter electrode as the reference is supplied to a third pixel that is connected to the data signal line of the same column as the first pixel on the n-th row and connected to the (n+1)th scanning signal line (dot inversion drive). Moreover, the polarity of the voltage applied to each pixel is inverted every frame for all the pixels (frame inversion drive). For example, FIG. 6 shows an example of polarity pattern of the voltages applied to the pixels during a given frame period in the LCD device 300A of this embodiment. In the frame next to that shown in FIG. 6, the plus and minus are inverted for all the pixels.

Figure 7A:
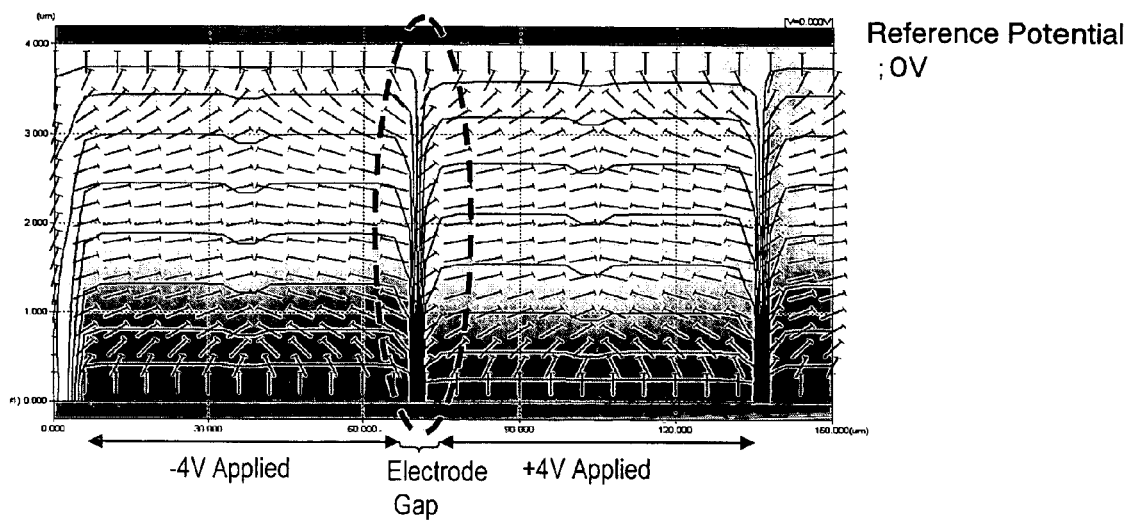
FIGS. 7A, 7B and 7C are views diagrammatically showing the simulation results of the behavior of equipotential lines and liquid crystal directors observed when voltages are applied across the liquid crystal layer, in the cases of adopting a drive method according to the present invention (FIG. 7A) and conventional drive methods (FIGS. 7B and 7C).
Figure 7B:
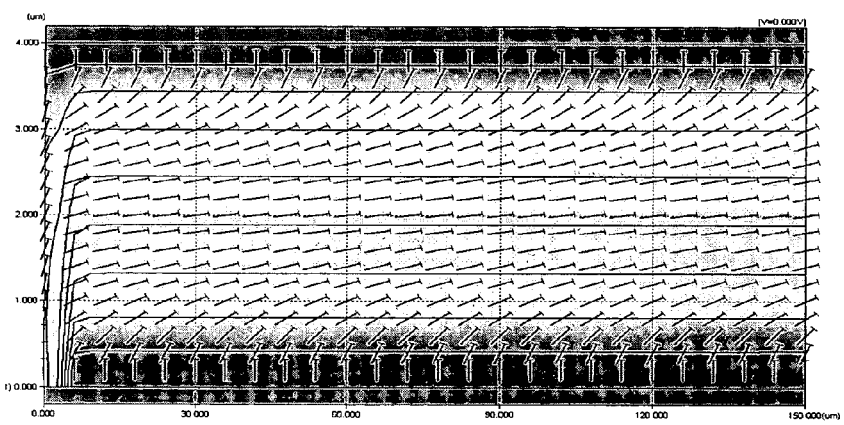
Figure 7C:
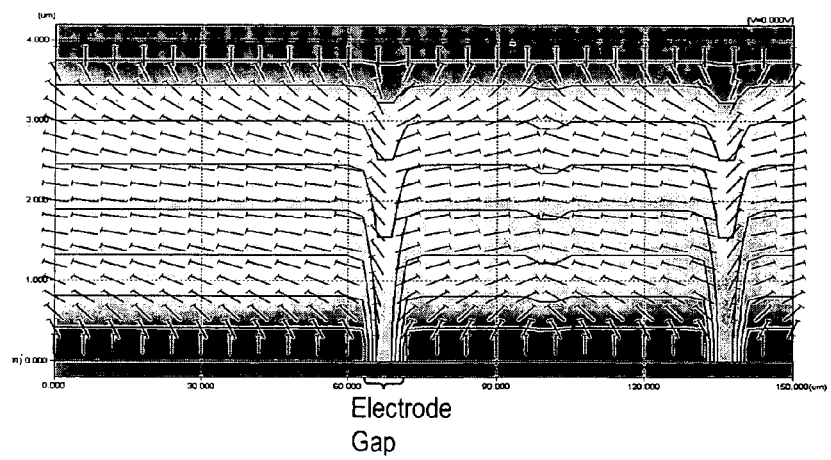

FIGS. 7A to 7C show the simulation results of the behavior of equipotential lines and liquid crystal directors observed when a voltage was applied across the liquid crystal layer. The drive voltage for the liquid crystal layer was set at 4V. To check the effect of drawing equipotential lines with an electric field, comparison is made between the effects obtained when the width of the gap between adjacent pixel electrodes was 3 μm and when it was 9 μm. Also, shown are the case that voltages of the same polarity were applied to adjacent pixel electrodes as in the conventional line inversion drive and the like and the case that voltages of opposite polarity with respect to the counter electrode as the reference were applied to adjacent pixel electrodes (present invention).

Specifically, FIG. 7A shows the simulation results obtained when voltages of opposite polarity were applied to adjacent pixel electrodes by the drive method in this embodiment of the present invention (inter-electrode gap: 3 μm). FIGS. 7B and 7C show the simulation results obtained when voltages of the same polarity were applied to adjacent pixels by the conventional drive method (inter-electrode gap: 3 μm and 9 μm, respectively).

It is found from the results that when voltages of opposite polarity are applied to adjacent pixels, a steep potential gradient occurs at the boundary of the pixels, resulting in more effective drawing of equipotential lines. For example, in the drive method in this embodiment, equipotential lines are drawn more effectively than in the conventional case of applying voltages of the same polarity to adjacent pixels and having an inter-pixel gap of 9 μm, causing liquid crystal molecules to be tilted with the electric field. It is also found that in the drive method in this embodiment, the alignment of liquid crystal molecules is effectively controlled with the electric field even when the inter-electrode gap is 3 μm.

As described above, a large potential gradient can be formed between adjacent pixels by applying voltages of opposite polarity with respect to the counter electrode as the reference to the adjacent pixels for each frame. This potential gradient can be used to produce alignment regulating force for further stabilizing the axisymmetric alignment formed in a vertically aligned liquid crystal layer.

The above drive method proved useful for alignment stabilization is also very effective in reducing flickering of the liquid crystal panel.

In a general active liquid crystal panel, because of inadequate characteristics of switching elements such as TFTs provided in individual pixels, the transmittance of the liquid crystal layer is not completely symmetric in response to symmetric positive/negative data voltages that are supplied from the source signal drive circuit 303 (in the column direction). Flickering is therefore prominent in some cases in a liquid crystal panel adopting a drive method in which the polarity of the voltage applied across the liquid crystal layer is inverted every frame (one-frame inversion drive).

As measures for reducing such flickering, there is known a drive method in which the polarity is inverted every horizontal scanning line and further inverted every frame period (1H inversion drive). Also known is a drive method in which the polarity of the voltage applied across the liquid crystal layer constituting pixels is inverted every scanning signal line and also every data signal line and further inverted every frame period (dot inversion drive). The dot inversion drive, which is also adopted in this embodiment, is most effective in reducing flickering. It has however been pointed out that the dot inversion drive has the problem that the IC breakdown voltage for the source signal line drive circuit must be set high because voltages of positive and negative polarity are applied to pixel electrodes on the same scanning signal line.

Note that in the LCD devices of the embodiment of the present invention, the axisymmetric alignment is formed using the alignment regulating force of the wall structure. Accordingly, the axisymmetric alignment can be stabilized even in grayscale display in which a sufficient electric field is not obtained, and thus the grayscale display quality can be improved.

(Operation Principle)

The reason why the LCD device having a vertically aligned liquid crystal layer of the embodiment of the present invention has excellent wide viewing angle characteristics will be described with reference to FIGS. 8A and 8B.

Figure 8A:
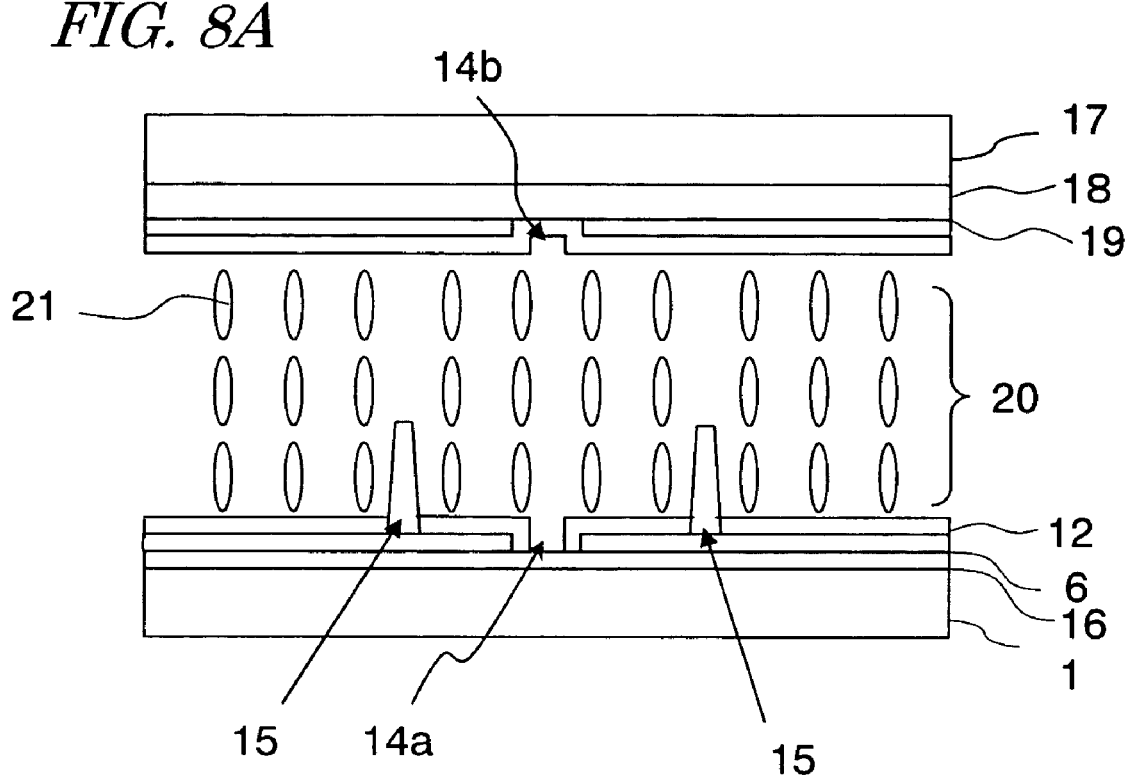
FIGS. 8A and 8B are diagrammatic views for demonstrating the operation principle of the LCD devices of the embodiments of the present invention, showing the states during non-voltage application (FIG. 8A) and during voltage application (FIG. 8B).
Figure 8B:
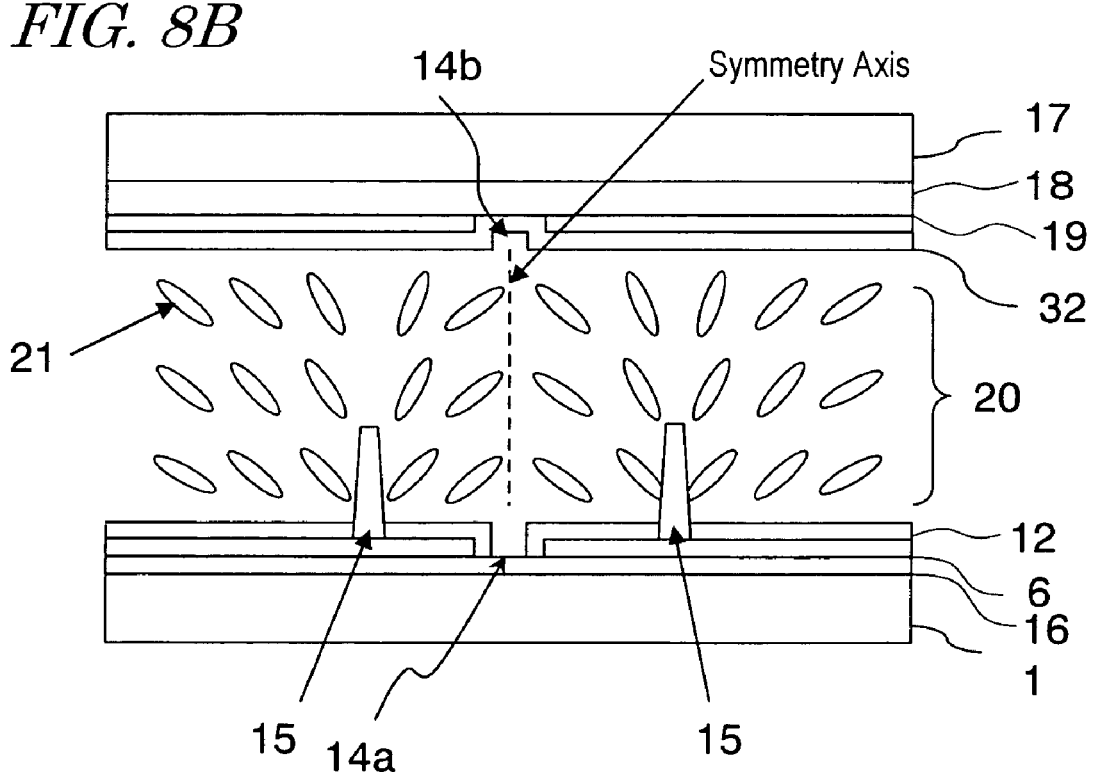

FIGS. 8A and 8B are views for demonstrating how the alignment regulating forces of a wall structure 15 and an opening 14a formed on the active matrix substrate and an opening 14b formed on the color filter substrate act, in which the aligned states of liquid crystal molecules during non-voltage application (FIG. 8A) and during voltage application (FIG. 8B) are diagrammatically shown. The state shown in FIG. 8B is for display of a grayscale level.

The LCD device shown in FIGS. 8A and 8B includes an insulating film 16, a pixel electrode 6 having the opening 14a at a predetermined position, the wall structure 15 and an alignment film 12 formed in this order on a transparent substrate 1. The LCD device also includes a color filter layer 18, a counter electrode 19 having the opening 14b at a predetermined position and an alignment film 32 formed in this order on another transparent substrate 17. A liquid crystal layer 20 interposed between the two substrates includes liquid crystal molecules 21 having negative dielectric anisotropy.

As shown in FIG. 8A, during non-voltage application, the liquid crystal molecules 21 are aligned roughly vertical to the substrate surface with the alignment regulating force of the vertical alignment films 12 and 32.

As shown in FIG. 8B, during voltage application, the liquid crystal molecules 21 having negative dielectric anisotropy attempt to make their major axes vertical to electric lines of force, and this causes the directions in which the liquid crystal molecules 21 fall to be defined with an inclined electric field generated around the pair of openings 14a and 14b and distortion in electric field occurring near the side faces (wall faces) of the wall structure 15 together with the alignment regulating force of the wall structure 15. In this way, the liquid crystal molecules 21 are aligned axisymmetrically around the openings 14a and 14b as the center. In the resultant axisymmetrically aligned domain, liquid crystal directors point in all directions (directions in the substrate plane), and thus, excellent viewing angle characteristics can be obtained. Herein, the term "axisymmetric alignment (or orientation)" has the same meaning as the term "radially inclined alignment (or orientation)". These terms refer to the state where liquid crystal molecules are continuously oriented without forming disclination around the central axis of axisymmetric alignment (center of the radially inclined alignment), and the longer axis of the liquid crystal molecules is oriented radially, tangentially, or spirally. In either case, the longer axis of the liquid crystal molecules has a component radially inclining from the center of the orientation (i.e., a component parallel to the inclined electric field).

Although the action of the inclined electric field generated around the openings 14a and 14b and the alignment regulating force of the wall structure 15 were referred to in the above description, an inclined electric field is also generated around cuts formed at edges of the pixel electrode 6, and the directions of the tilt of the liquid crystal molecules 21 are also defined with this inclined electric field.

Moreover, the inclined electric field generated between adjacent pixel electrodes by adopting the dot inversion drive described above also acts to stabilize the axisymmetric alignment of the liquid crystal molecules.

The construction of an LCD device according to the present invention will be described with reference to FIG. 9.

Figure 9:
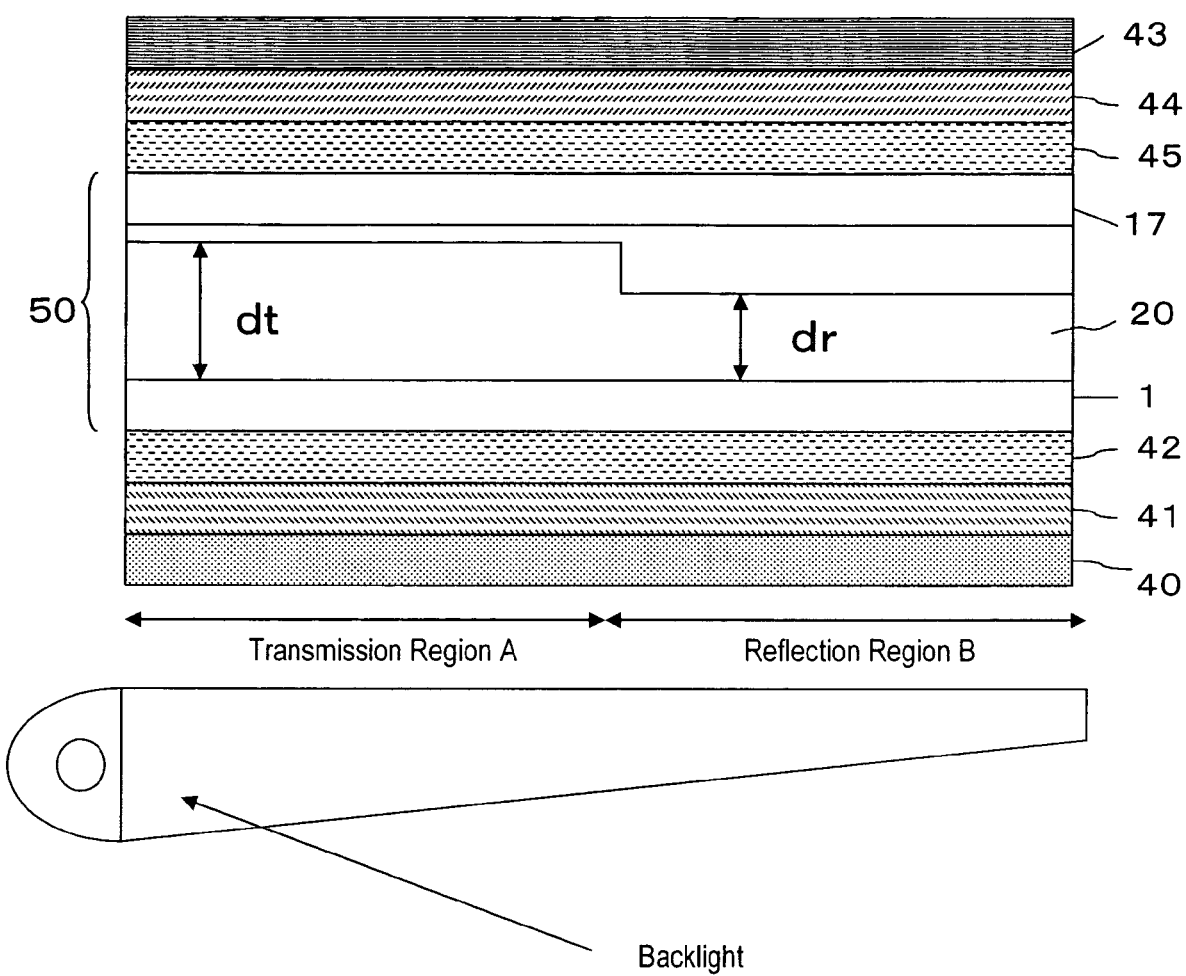
FIG. 9 is a diagrammatic view showing an example of construction of an LCD device of an embodiment of the present invention.

The LCD device shown in FIG. 9 includes: a backlight; a transflective liquid crystal panel 50; a pair of polarizing plates 40 and 43 placed to face each other via the transflective liquid crystal panel 50; a quarter wave plates 41 and 44 respectively placed between the polarizing plates 40 and 43 and the liquid crystal panel 50; and phase plates 42 and 45 having negative optical anisotropy respectively placed between the wave plates 41 and 44 and the liquid crystal panel 50. The liquid crystal panel 50 includes a vertically aligned liquid crystal layer 20 between a transparent substrate (active matrix substrate) 1 and a transparent substrate (counter substrate) 17. As the liquid crystal panel 50, one having the same construction as that of the LCD device 200 shown in FIGS. 2A and 2B is used.

The display operation of the LCD device shown in FIG. 9 will be briefly described.

In reflection-mode display, light incident from above passes through the polarizing plate 43 to be output as linearly polarized light. The linearly polarized light is changed to circularly polarized light with the quarter wave plate 44 placed so that the slower axis thereof forms 45° with the transmission axis of the polarizing plate 43. The circularly polarized light passes through the color filter layer (not shown) formed on the substrate 17. In the illustrated example, the phase plate 45 provides no phase difference for light incident in the normal direction.

During non-voltage application, in which liquid crystal molecules in the liquid crystal layer 20 are aligned roughly vertical to the substrate plane, incident light passes through the liquid crystal layer 20 with a phase difference of roughly 0 and is reflected with the reflective electrode formed on the lower substrate 1. The reflected circularly polarized light passes again through the liquid crystal layer 20 and the color filter layer. The light then passes through the phase plate 45 having negative optical anisotropy as the circularly polarized light, to enter the quarter wave plate 44, where the light is changed to linearly polarized light having a polarizing direction orthogonal to the polarizing direction given to the incident light after first passing through the polarizing plate 43, and reaches the polarizing plate 43. The resultant linearly polarized light fails to pass through the polarizing plate 43, and thus black display is provided.

During voltage application, in which the liquid crystal molecules in the liquid crystal layer 20 are tilted toward the horizontal direction from the direction vertical to the substrate plane, the incident circularly polarized light is changed to elliptically polarized light due to birefringence of the liquid crystal layer 20, and reflected with the reflective electrode formed on the lower substrate 1. The polarized state of the reflected light is further changed during passing back through the liquid crystal layer 20. The reflected light passes again through the color filter layer and then the phase plate 45 having negative optical anisotropy, to enter the quarter wave plate 44 as the elliptically polarized light. Accordingly, when reaching the polarizing plate 43, the light is not linearly polarized light having a polarizing direction orthogonal to the polarizing direction given to the original incident light, and thus passes through the polarizing plate 43. That is to say, by adjusting the applied voltage, the degree of the tilt of the liquid crystal molecules can be controlled, and thus the amount of reflected light allowed to pass through the polarizing plate 43 can be changed, to thereby enable grayscale display.

In transmission-mode display, the upper and lower polarizing plates 43 and 40 are placed so that the transmission axes thereof are orthogonal to each other. Light emitted from a light source is changed to linearly polarized light at the polarizing plate 40, and then changed to circularly polarized light when being incident on the quarter wave plate 41 placed so that the slower axis thereof forms 45° with the transmission axis of the polarizing plate 40. The circularly polarized light then passes through the phase plate 42 having negative optical anisotropy and is incident on the transmission region A of the lower substrate 1. In the illustrated example, the phase plate 42 provides no phase difference for light incident in the normal direction.

During non-voltage application, in which liquid crystal molecules in the liquid crystal layer 20 are aligned roughly vertical to the substrate plane, the incident light passes through the liquid crystal layer 20 with a phase difference of roughly 0. That is, the light incident on the lower substrate 1 as circularly polarized light passes through the liquid crystal layer 20 and then the upper substrate 17 in this state. The light then passes through the upper phase plate 45 having negative optical anisotropy, to enter the quarter wave plate 44. The lower and upper quarter wave plates 41 and 44 are placed so that the slower axes thereof are orthogonal to each other. Therefore, a phase difference in the polarized light that has entered the quarter wave plate 44, which was given at the lower quarter wave plate 41, can be cancelled with the quarter wave plate 44, and thus the light resumes the original linearly polarized light. The polarized light coming from the upper quarter wave plate 44 is therefore linearly polarized light having the polarizing direction parallel with the transmission axis (polarizing axis) of the polarizing plate 40, and thus absorbed with the polarizing plate 43 of which the transmission axis is orthogonal to that of the polarizing plate 40. Accordingly, black display is provided.

During voltage application, in which the liquid crystal molecules in the liquid crystal layer 20 are tilted toward the horizontal direction from the direction vertical to the substrate plane, the incident circularly polarized light is changed to elliptically polarized light due to birefringence of the liquid crystal layer 20. The light then passes through the color filter layer 17, the phase plate 45 having negative optical anisotropy, and the quarter wave plate 44 as the elliptically polarized light. Accordingly, when reaching the polarizing plate 43, the light is not linearly polarized light orthogonal to the polarized component in the original incident light, and thus passes through the polarizing plate 43. That is to say, by adjusting the applied voltage, the degree of the tilt of the liquid crystal molecules can be controlled, and thus the amount of light allowed to pass through the polarizing plate 43 can be changed, to thereby enable grayscale display.

The phase plate having negative optical anisotropy minimizes the amount of change in phase difference occurring with change of the viewing angle when the liquid crystal molecules are in the vertically aligned state, and thus suppresses black floating observed when the display device is viewed at a wide viewing angle. In place of the combination of the phase plate having negative optical anisotropy and the quarter wave plate, a biaxial phase plate unifying the functions of both plates may be used.

When axisymmetrically aligned domains are used to implement the normally black mode that presents black display during non-voltage application and white display during voltage application, as of Embodiment 1 of the present invention, a polarizing plate-caused extinction pattern can be eliminated by placing a pair of quarter wave plates on the top and bottom of the LCD device (panel), and thus the brightness can be improved. Also, when axisymmetrically aligned domains are used to implement the normally black mode with upper and lower polarizing plates placed so that the transmission axes thereof are orthogonal to each other, it is theoretically possible to present black display of substantially the same level as that obtained when a pair of polarizing plates are placed under crossed nicols. Therefore, a considerably high contrast ratio can be obtained, and also, with the all-direction alignment of liquid crystal molecules, wide viewing angle characteristics can be attained.

Figure 10:
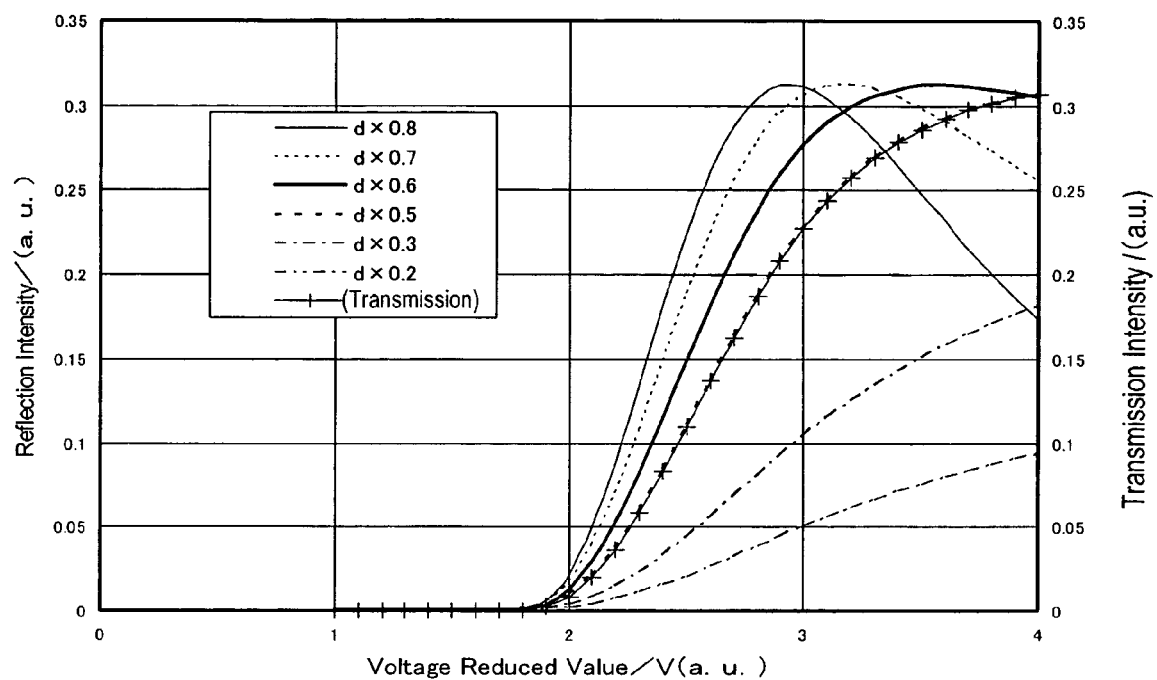
FIG. 10 is a graph showing the dependence of the voltage-reflectance (transmittance) of a transmission region and a reflection region on the thickness of the liquid crystal layer in an LCD device of an embodiment of the present invention.

The thicknesses dt and dr of the liquid crystal layer in the transmission region and the reflection region defined of Embodiment 1 of the present invention preferably has the relationship satisfying 0.3dt<dr<0.7dt, more preferably 0.4dt<dr<0.6dt, as is found from the dependence of the voltage-reflectance (transmittance) of the transmission region and the reflection region on the thickness of the liquid crystal layer shown in FIG. 10. If the thickness of the liquid crystal layer in the reflection region is smaller than the lower limit, the reflectance will be 50% or less of the maximum reflectance, failing to provide sufficiently high reflectance. If the thickness dr of the liquid crystal layer in the reflection region is greater than the upper limit, the peak of the reflectance in the voltage-reflectance characteristics exists at a drive voltage different from that in the case of the transmission display. Also, the relative reflectance tends to be low at a white display voltage optimal for the transmission display. The reflectance is as low as 50% or less of the maximum reflectance, failing to provide sufficiently high reflectance. Since the optical length in the liquid crystal layer in the reflection region is double that in the transmission region, the birefringence anisotropy (Δn) of the liquid crystal material and the panel cell thickness design are very important when the same design is made for both the transmission region and the reflection region.

Specific characteristics of the transflective LCD device of the embodiment of Embodiment 1 of the present invention will be described as follows.

An LCD device having the construction shown in FIG. 9 was fabricated. As the liquid crystal cell 50, one having the same construction as that of the LCD device 200 shown in FIGS. 2A and 2B was used.

In the pixel electrode of the TFT substrate, openings (first openings) having a diameter of 5 μm were formed at predetermined positions in the transmission region and the reflection region, and also the wall structure was formed above the signal lines and the like surrounding each pixel in the shading region. In the counter electrode of the counter substrate, openings (second openings) having a diameter of 5 μm for fixing the center axes of axisymmetrically aligned domains were formed at predetermined positions in the transmission region and the reflection region. Each pair of first and second openings was placed so that they are superposed one on the other spatially via the liquid crystal layer. The width of the cuts was set at 3 μm and the width of the gap between the adjacent pixel electrodes was set at 5 μm. A transparent dielectric layer having no light scattering function was formed on the color filter substrate as the transparent dielectric layer 234, and a resin layer having a continuous uneven surface was formed under the reflective electrode 211b, to adjust the diffuse reflection characteristics in the reflection display.

The vertical alignment films were formed by a known method using a known alignment film material. No rubbing was made. A liquid crystal material having negative dielectric anisotropy (Δn: 0.1 and Δ∈: −4.5) was used. In this example, the thicknesses dt and dr of the liquid crystal layer in the transmission region and the reflection region were set at 4 μm and 2.2 μm, respectively (dr=0.55dt).

The LCD device of this example had a multilayer structure composed of a polarizing plate (observer side), a quarter wave plate (phase plate 1), a phase plate having negative optical anisotropy (phase plate 2 (NR plate)), the liquid crystal layer (on the upper and lower sides thereof, the color filter substrate and the active matrix substrate were respectively placed), a phase plate having negative optical anisotropy (phase plate 3 (NR plate)), a quarter wave plate (phase plate 4), and a polarizing plate (backlight side) in the order from the observer side. The upper and lower quarter wave plates (phase plates 1 and 4) were placed so that the slower axes thereof were orthogonal to each other, and had a phase difference of 140 nm. The phase plates having negative optical anisotropy (phase plates 2 and 3) had a phase difference of 135 nm. The two polarizing plates were placed so that the absorption axes thereof were orthogonal to each other.

A drive signal was applied to the thus-obtained LCD device (4V was applied across the liquid crystal layer) to evaluate the display characteristics. In this embodiment, in particular, the dot inversion drive was adopted in which signals of +4V and −4V with respect to the counter electrode as the reference were applied to adjacent pixels in one frame and the polarity was inverted in the next frame, to evaluate the display characteristics.

Figure 11:
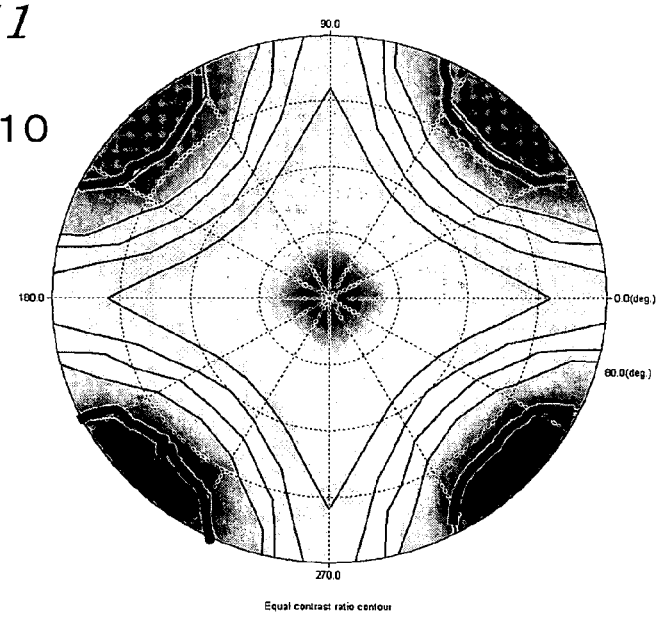
FIG. 11 is a view showing the visual angle—contrast ratio characteristics of an LCD device of an embodiment of the present invention.

The results of the visual angle—contrast characteristics are shown in FIG. 11. The viewing angle characteristics in the transparent display were roughly symmetric in all directions, the range CR>10 was as large as up to ±80°, and the transmission contrast was as high as 300:1 or more at the front. In addition, since the gap between adjacent pixel electrodes could be narrowed compared with the cases of adopting conventional drive methods such as the line inversion in which drive signals of the same polarity were applied to adjacent pixel electrodes, improvement in transmittance by about 15% from the conventional cases was recognized.

As for the characteristics of the reflection display, the reflectance evaluated with a spectral colorimeter (CM2002 from Minolta Co., Ltd.) was about 9.5% (value in terms of the aperture ratio of 100%) with respect to a standard diffuse plate as the reference. The contrast value of the reflection display was 24, which was high compared with the case of the conventional LCD devices.

No roughness of display was observed in visual evaluation in a slanting direction in a grayscale level (level 2 in the eight levels of grayscale).

The grayscale response time (time required for a change from level 3 to level 5 in the eight levels of grayscale) was 35 msec for the LCD device having pairs of openings formed in the upper and lower substrates. It was therefore recognized that the response time greatly improved with the construction of the liquid crystal panel according to the present invention. As for the recovery of the alignment after the display panel was pressed with a fingertip during application of 4V (white display), an afterimage was hardly observed on the pressed portion.

The liquid crystal panel according to the present invention was driven by the conventional 1H line inversion drive method in which voltages of the same polarity were applied to adjacent pixel electrodes. As a result, when the width of the gap between the adjacent pixel electrodes was 3 μm, sufficient control of the alignment of liquid crystal molecules failed as shown in FIG. 7B, and the phenomenon of generating disclination in the liquid crystal region was recognized. Also, the display contrast and the response speed were insufficient, and degradation in display quality was conspicuous.

EMBODIMENT 2

Hereinafter, LCD devices of Embodiment 2 of the present invention will be described concretely with reference to FIGS. 1A/B/C to 4, 5B and 6 to 11. The LCD devices of Embodiment 2 are different from the LCD devices of Embodiment 1 in that only the dot inversion drive is adopted and that the wall structure can be omitted.

(Transmissive LCD Device)

A transmissive LCD device 100 of Embodiment 2 of the present invention will be described with reference to FIGS. 1A and 1B. FIGS. 1A and 1B diagrammatically show one pixel of the transmissive LCD device 100, in which FIG. 1A is a plan view and FIG. 1B is a cross-sectional view taken along line 1B-1B' in FIG. 1A. FIG. 1C is a cross-sectional view diagrammatically showing one pixel of another transmissive LCD device 100'.

Hereinafter, described will be the case that one pixel is divided into two parts (N=2). The number of parts into which one pixel is divided (=N) can also be three or more depending on the pixel pitch. In any case, the number of openings (=n) each to be positioned roughly in the center of a divided region on a second substrate is preferably the same as the number of divided parts (=N). The effective aperture ratio tends to decrease with increase of the number of divided parts (=N). Therefore, for an application to a high-definition display panel, the number of divided parts (=N) is preferably made small. The present invention is also applicable to the case involving no pixel division (this may be expressed as N=1). Each of the divided regions may be called a "sub-pixel". One liquid crystal domain is typically formed in each sub-pixel.

The LCD device 100 includes a transparent substrate (for example, a glass substrate) 110a, a transparent substrate 110b placed to face the transparent substrate 110a, and a vertically aligned liquid crystal layer 120 interposed between the transparent substrates 110a and 110b. Vertical alignment films (not shown) are formed on the surfaces of the substrates 110a and 110b facing the liquid crystal layer 120. During non-voltage application, therefore, liquid crystal molecules in the liquid crystal layer 120 are aligned roughly vertical to the surfaces of the vertical alignment films. The liquid crystal layer 120 includes a nematic liquid crystal material having negative dielectric anisotropy and also includes a chiral agent as required.

The LCD device 100 further includes pixel electrodes 111 formed on the transparent substrate 110a and a counter electrode 131 formed on the transparent substrate 110b. Each pixel electrode 111, the counter electrode 131 and the liquid crystal layer 120 interposed between these electrodes define a pixel. In the illustrated example, both the pixel electrodes 111 and the counter electrode 131 are formed of a transparent conductive layer (for example, an ITO layer). Typically, color filters 130 (the entire of the plurality of color filters may also be called a color filter layer 130) provided for the respective pixels, as well as a black matrix (shading layer) 132 formed in the gaps between the adjacent color filters 130, are formed on the surface of the transparent substrate 110b facing the liquid crystal layer 120, and the counter electrode 131 is formed on the color filters 130 and the black matrix 132. Alternatively, the color filters 130 and the black matrix 132 may be formed on the counter electrode 131 (on the surface thereof facing the liquid crystal layer 120).

In the LCD device 100 shown in FIGS. 1A and 1B, in which the number of divided parts (=N) is 2, a wall structure 115 to be described later extends on the transparent substrate 110a in a shading region around the pixel electrodes 111. Each pixel electrode 111 has first openings 114a of the number corresponding to the number of divided parts (n=2 in the illustrated example) at predetermined positions in the pixel. The pixel electrode 111 also has four cuts 113 at predetermined positions. On the transparent substrate 110b, the counter electrode 131 of each pixel has second openings 114b of the number corresponding to the number of divided parts (n=2 in the illustrated example) at predetermined positions.

The first openings 114a and the second openings 114b are formed so that they are superposed one on the other spatially via the liquid crystal layer 120. The first openings 114a and the second openings 114b have the same size (diameter), and each pair of the first and second openings 1114a and 1114b facing each other (which are called a pair of openings 114 in some cases) coincide with each other when viewed from top as shown in FIG. 1A.

When a predetermined voltage is applied across the liquid crystal layer, two (number equal to the number of divided parts N) liquid crystal domains each having axisymmetric alignment are formed, with the center axes of the axisymmetric alignment thereof being in or near the first and second openings 114a and 114b. As will be described later in detail, the pairs of openings 114 act to fix the positions of the center axes of the axisymmetrically aligned domains. With the placement of the first opening 114a and the second opening 114b to be superposed one on the other as in the illustrated example, the reduction in effective aperture ratio due to the existence of the pair of openings 114 can be minimized. Since one center axis is fixed/stabilized with the joint action of the first opening 114a and the second opening 114b, the action exerted by the individual first or second opening 114a or 114b can be small compared with the case of fixing/stabilizing the center axis with one opening. It is therefore possible to reduce the diameter of the first and second openings 114a and 114b, and as a result, the reduction in effective aperture ratio can be minimized.

As will be described later in detail, in the LCD device of this embodiment of the present invention, voltage application for pixels arranged in a matrix having rows and columns is made so that the voltages applied to the pixel electrodes in adjacent pixels are of opposite polarity with respect to the voltage applied to the counter electrode 131 as the reference in both column and row directions in each vertical scanning period (dot inversion drive). By adopting the dot inversion drive described above, the alignment stabilizing effect given with an inclined electric field generated between adjacent pixels can be obtained on four sides of each pixel having a roughly rectangular shape. Therefore, a steeply inclined electric field is generated between the adjacent pixels, acting to stabilize the axisymmetric alignment.

Moreover, in the LCD device of this embodiment, switching elements connected to one arbitrary scanning signal line include switching elements connected to pixel electrodes 111 belonging to one of a pair of rows adjacent to the scanning signal line and switching elements connected to pixel electrodes 111 belonging to the other row alternately. With this arrangement, by adopting the conventional one-line inversion drive (1H inversion drive), it is resultantly possible to apply display signals of opposite polarity with respect to the counter electrode 131 as the reference to the portions of the liquid crystal layer of adjacent pixels both in the row and column directions (1H dot inversion drive).

In the LCD device of this embodiment, also, the center of the axisymmetric alignment is fixed/stabilized in or near the opening 114 as described above. This is because liquid crystal molecules existing around the opening 114 are aligned continuously (axisymmetrically aligned) with the opening 114 as the center with the action of an inclined electric field generated with the existence of the opening 114. Thus, with the action of the opening 114 (at least either one of the first opening 114a and the second opening 114b), formation of discontinuous alignment in the corner portions, as is found in FIG. 9 in Literature 7, is minimized/prevented. Also, with the action of the opening 114, sufficiently stable axisymmetric alignment is obtained even in a grayscale display state in which the electric field is low, and thus the time required to resume normal alignment from an alignment distortion occurring when the liquid crystal display panel is pressed can be shortened.

The shape of the first openings 114a and the second openings 114b provided at predetermined positions of the pixel electrode 111 and the counter electrode 131 is preferably circular as illustrated, but is not limited to this. The shape of the first openings 114a may be different from the shape of the second openings 114b. However, to exert roughly equal alignment regulating force in all directions, the shape is preferably a polygon having four or more sides and also preferably a regular polygon.

Although openings were placed in both the pixel electrode 111 and the counter electrode 131 in the illustrated example, the effect of stabilizing the center axis of the axisymmetric alignment can also be obtained by placing an opening only on one of the substrates. The configuration and placement of the first opening 114a and the second opening 114b are not limited to the illustrated example in which the first opening 114a and the second opening 114b having the same size are superposed one on the other. The first and second openings 114a and 114b can separately provide the effect of fixing/stabilizing the axisymmetric alignment even when they are not superposed one on the other. However, the fixation of the center axis of the axisymmetric alignment will be further stabilized if the placement is made so that the first opening 114a fixes one end of the center axis of the axisymmetric alignment of the liquid crystal domain and the second opening 114b fixes the other end of the center axis. Also, the reduction in effective aperture ratio due to the existence of the openings 114 will be lessened if the first and second openings 114a and 114b are placed to at least overlap each other via the liquid crystal layer. In this case, since one center axis is fixed/stabilized with the joint action of the first and second openings, the action to be exerted by the individual first or second opening 114a or 114b can be small compared with the case of fixing/stabilizing the center axis with one opening, and by superposing the first opening 114a and the second opening 114b having the same size one on the other as in the illustrated example, the reduction in effective aperture ratio can be minimized.

The LCD device 100 has a shading region surrounding each of the pixels, and the wall structure 115 is placed on the transparent substrate 110a in the shading region. The shading region as used herein refers to a region shaded from light due to the presence of TFTs, gate signal lines and source signal lines formed on the peripheries of the pixel electrodes 111 on the transparent substrate 110a, or the presence of the black matrix formed on the transparent substrate 110b, for example. Since this region does not contribute to display, the wall structure 115 formed in the shading region is free from adversely affecting the display.

The wall structure 115 acts to define the directions in which liquid crystal molecules fall during voltage application (during generation of an electric field) with its slope face effect. The alignment regulating force of the side slopes of the wall structure 115 also acts during non-voltage application to tilt liquid crystal molecules. Also, the electric field generated between adjacent pixels is distorted with the wall structure 115 existing between the adjacent pixels and acts to define the directions in which liquid crystal molecules tilt near the wall faces of the wall structure 115.

With the placement of the wall structure 115, the alignment regulating force of the wall structure 115 acts cooperatively with the alignment regulating force with the steeply inclined electric field generated between adjacent pixels and the inclined electric field generated around the openings 114, to further stabilize the axisymmetric alignment. By the joint use of the wall face effect of the wall structure 115, the stability of the axisymmetric alignment in a grayscale display state in which the alignment regulating force with the inclined electric field is weak is further improved. In addition, the time required to resume normal alignment from an alignment distortion occurring when the liquid crystal display panel is pressed can be further shortened.

The illustrated wall structure 115 is a continuous wall surrounding the pixel. Alternatively, the wall structure 115 may be composed of a plurality of separate walls. The wall structure 115, which serves to define the boundaries of liquid crystal domains located near the outer edges of the pixel, should preferably have a length of some extent. For example, when the wall structure is composed of a plurality of walls, each wall is preferably longer than the gap between the adjacent walls.

The cuts 113, provided in the pixel electrode 111 near the boundaries of the axisymmetrically aligned domains, define the directions in which liquid crystal molecules fall with an electric field, and thus act to form the axisymmetrically aligned domains more stably. By the use of the cuts 113 in combination with the wall structure 115 as in the illustrated example, the directions in which liquid crystal molecules tilt are defined with the inclined electric fields generated around the openings 114 and the cuts 113 and the distorted electric field near the wall faces of the wall structure 115, and as a result, two axisymmetrically aligned domains are formed stably as described above. The cuts 113 include four cuts 113 formed point-symmetrically with respect to the openings 114 corresponding to the center axis of a liquid crystal domain formed in the pixel (in this case, the right opening as viewed from FIG. 1A) (in this case, the entire pixel is a transmission region).

By providing the cuts 113 as described above, the directions in which liquid crystal molecules fall during voltage application are defined, allowing formation of two liquid crystal domains. The reason why no cuts are provided on the left side of the pixel electrode 111 as viewed from FIG. 1A is that substantially the same function is obtained from cuts provided on the right side of the adjacent pixel electrode (not shown) located left to the illustrated pixel electrode 111, and thus cuts, which may decrease the effective aperture ratio of the pixel, are omitted on the left side of the pixel electrode 111. Also, in the illustrated example, the wall structure 115 to be described later gives the alignment regulating force. Therefore, with no cuts provided on the left side of the pixel electrode 111, the resultant liquid crystal domain is as stable as a liquid crystal domain having such cuts. In addition, the effect of improving the effective aperture ratio is obtained.

Although a total of four cuts 113 were formed in the illustrated example, at least one cut between the adjacent liquid crystal domains is sufficient. For example, an elongate cut may be formed in the center of the pixel and the other cuts may be omitted.

The shape of the cuts 113 acting to define the directions in which liquid crystal molecules in the axisymmetrically aligned domains fall with the electric field is determined so that roughly equal alignment regulating force is exerted for the adjacent axisymmetrically aligned domains. For example, a square is preferred. The cuts may be omitted.

Supports 133 for defining the thickness of the liquid crystal layer 120 (also called the cell gap) are preferably formed in the shading region (in the illustrated example, the region defined by the black matrix 132) to avoid degradation in display quality due to the supports. Although the supports 133 are formed on the wall structure 115 provided in the shading region in the illustrated example, the supports 133 may be formed on either transparent substrate 110a or 110b. In the case of forming the supports 133 on the wall structure 115, setting is made so that the sum of the height of the wall structure 115 and the height of the supports 133 is equal to the thickness of the liquid crystal layer 120. If the supports 133 are formed in a region having no wall structure 115, setting is made so that the height of the supports 133 is equal to the thickness of the liquid crystal layer 120. The supports 133 can be formed by photolithography using a photosensitive resin, for example.

In the LCD device 100, the axisymmetric alignment is given with the action of an inclined electric field generated between adjacent pixels by adopting the dot inversion drive, and the center axes of the two axisymmetrically aligned domains are fixed/stabilized in or near the two pairs of openings 114 formed in the center portions of the pixel electrode 111 and the counter electrode 131. In addition, the electric field distorted with the wall faces of the wall structure 115 and the wall face effect of the wall structure 115 mainly define the directions in which liquid crystal molecules in the two adjacent liquid crystal domains fall with an electric field. Also, the inclined electric field generated near the pair of cuts 133 acts to define the directions in which liquid crystal molecules in the two adjacent liquid crystal domains fall with an electric field. Such alignment regulating forces act cooperatively, to stabilize the axisymmetric alignment of the liquid crystal domains even in a grayscale display state.

With the pairs of openings 114 formed at positions in the pixel electrode 111 and the counter electrode 131 corresponding to the center axes of the axisymmetrically aligned liquid crystal domains, the positions of the center axes are fixed/stabilized. As a result of the fixation of the center axes of the axisymmetrically aligned liquid crystal domains over the entire liquid crystal display panel, the uniformity of the display improves. Also, as a result of the stabilization of the axisymmetric alignment, the response time in grayscale display can be shortened. Moreover, occurrence of an afterimage due to pressing of the liquid crystal display panel can be reduced (the time required to resume from the pressing can be shortened). The axisymmetric alignment is further stabilized with the existence of the wall structure 115. Therefore, if reduction in occurrence of an afterimage due to pressing is particularly desired, forming the wall structure is preferred.

On the surface of the transparent substrate 110a facing the liquid crystal layer 120, provided are active elements such as TFTs and circuit elements such as gate signal lines and source signal lines connected to TFTs (all of these elements are not shown). Herein, the transparent substrate 110a, together with the circuit elements and the pixel electrodes 111, the wall structure 115, the supports 133, the alignment film and the like described above formed on the transparent substrate 110a, are collectively called an active matrix substrate in some cases. Likewise, the transparent substrate 110b, together with the color filter layer 130, the black matrix 132, the counter electrode 131, the alignment film and the like formed on the transparent substrate 110b, are collectively called a counter substrate or a color filter substrate in some cases. The supports 133 may be formed either on the active matrix substrate or on the color filter substrate.

Figure 1B:
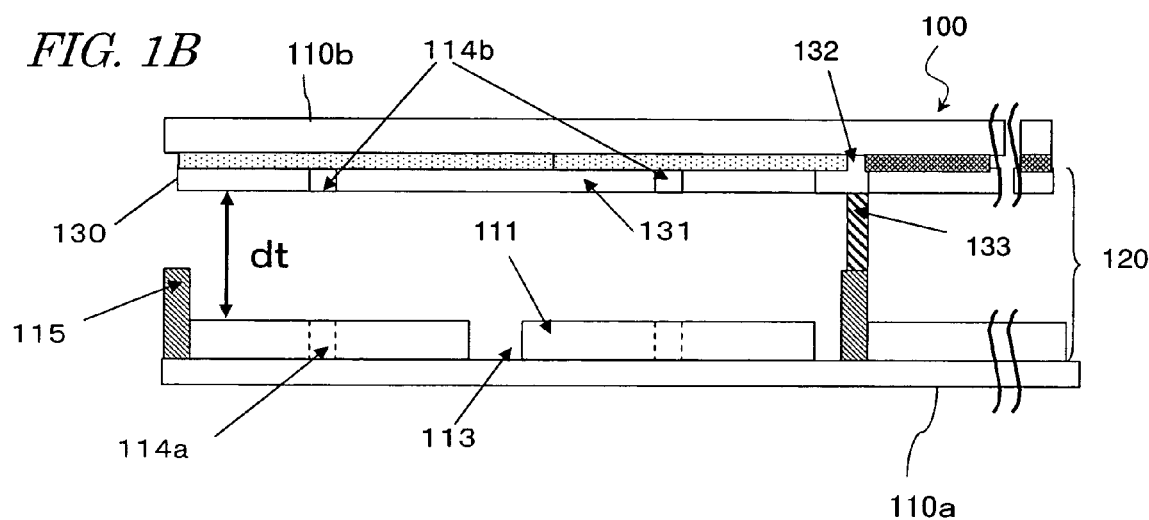
Figure 1C:
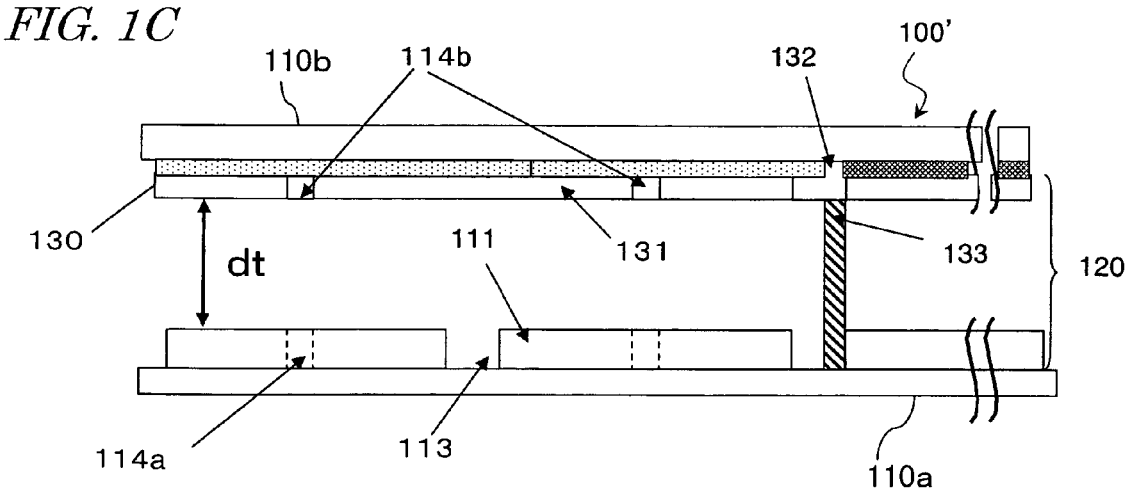
FIG. 1C is a cross-sectional view diagrammatically showing one pixel of another transmissive LCD device 100'.

The LCD device 100' shown in FIG. 1C is different from the LCD device 100 shown in FIGS. 1A and 1B in that no wall structure is provided. In FIG. 1C, the same components as those of the LCD device 100 are denoted by the same reference numerals as those in FIG. 1B.

In the LCD device 100', as in the LCD device 100, two axisymmetrically aligned domains, of which the center axes are fixed/stabilized in or near the openings 114 (at least either the first openings 114a or the second openings 114b), are formed stably with a steeply inclined electric field generated between adjacent pixels by adopting the dot inversion drive and an inclined electric field generated near the openings 114 formed in the pixel electrode 111 and the counter electrode 131. In addition, the cuts 113 formed in the pixel electrode 111 define the aligned directions of liquid crystal molecules existing near the boundaries of the liquid crystal domains, and this further stabilizes the axisymmetric alignment of the two liquid crystal domains.

In the LCD device 100', as in the LCD device 100, switching elements connected to one arbitrary scanning signal line include switching elements connected to pixel electrodes 111 belonging to one of a pair of rows adjacent to the scanning signal line and switching elements connected to pixel electrodes 111 belonging to the other row alternately. With this arrangement, by adopting the conventional 1H inversion drive, it is resultantly possible to apply display signals of opposite polarity with respect to the counter electrode 131 as the reference to the portions of the liquid crystal layer of adjacent pixels both in the row and column directions (1H dot inversion drive).

Although omitted in the above description, the LCD devices 100 and 100' further include a pair of polarizing plates placed to face each other via the transparent substrates 110a and 110b. The polarizing plates are typically placed so that their transmission axes are orthogonal to each other. The LCD device may further include a biaxial optical anisotropic medium layer and/or a uniaxial optical anisotropic medium layer, as will be described later.

(Transflective LCD Device)

Next, a transflective LCD device 200 of embodiment 2 of the present invention will be described with reference to FIGS. 2A and 2B.

FIGS. 2A and 2B diagrammatically show one pixel of the transflective LCD device 200 of this embodiment of the present invention, in which FIG. 2A is a plan view and FIG. 2B is a cross-sectional view taken along line 2B-2B' in FIG. 2A.

Hereinafter, described will be a case that one pixel is divided into three parts (N=3; two for the transmission region and one for the reflection region). The number of parts into which one pixel is divided (=N) can be at least two (at least one for the transmission region and at least one for the reflection region) determined depending on the pixel pitch. The number of openings (=n) each to be positioned roughly in the center of a divided region (region in which an axisymmetrically aligned domain is formed) on the counter substrate (second substrate) is preferably the same as the number of divided parts (=N). Note however that if a transparent dielectric layer is selectively formed on the surface of the counter substrate facing the liquid crystal layer in the reflection region, to be described later, no opening may be formed in the counter electrode (second electrode) in the reflection region. The effective aperture ratio tends to decrease with increase of the number of divided parts (=N). Therefore, for an application to a high-definition display panel, the number of divided parts (=N) is preferably made small.

The LCD device 200 includes a transparent substrate (for example, a glass substrate) 210a, a transparent substrate 210b placed to face the transparent substrate 210a, and a vertically aligned liquid crystal layer 220 interposed between the transparent substrates 210a and 210b. Vertical alignment films (not shown) are formed on the surfaces of the substrates 210a and 210b facing the liquid crystal layer 220. During non-voltage application, therefore, liquid crystal molecules in the liquid crystal layer 220 are aligned roughly vertical to the surfaces of the vertical alignment films. The liquid crystal layer 220 includes a nematic liquid crystal material having negative dielectric anisotropy and also includes a chiral agent as required.

The LCD device 200 further includes pixel electrodes 211 formed on the transparent substrate 210a and a counter electrode 231 formed on the transparent substrate 210b. Each pixel electrode 211, the counter electrode 231 and the liquid crystal layer 220 interposed between these electrodes define a pixel. Circuit elements such as TFTs are formed on the transparent substrate 210a as will be described later. Herein, the transparent substrate 210a and the components formed thereon are collectively called an active matrix substrate 210a in some cases.

Typically, color filters 230 (the entire of the plurality of color filters may also be called a color filter layer 230) provided for the respective pixels, as well as a black matrix (shading layer) 232 provided in the gaps between the adjacent color filters 230, are formed on the surface of the transparent substrate 210b facing the liquid crystal layer 2220, and the counter electrode 231 is formed on the color filters 230 and the black matrix 232. Alternatively, the color filters 230 and the black matrix 232 may be formed on the counter electrode 231 (on the surface thereof facing the liquid crystal layer 220). Herein, the transparent substrate 210b and the components formed thereon are collectively called a counter substrate (color filter substrate) 210b in some cases.

Each pixel electrode 211 includes a transparent electrode 211a formed of a transparent conductive layer (for example, an ITO layer) and a reflective electrode 211b formed of a metal layer (for example, an Al layer, an Al-including alloy layer, and a multilayer film including any of these layers). Having such a pixel electrode, each pixel includes a transmission region A defined by the transparent electrode 211a and a reflection region B defined by the reflective electrode 211b, to provide display in the transmission mode and display in the reflection mode, respectively.

In the LCD device 200 shown in FIGS. 2A and 2B, in which the number of divided parts (=N) is 3 (two for the transmission region and one for the reflection region), a wall structure 215 to be described later extends on the transparent substrate 210a in a shading region around each pixel electrode 211. The pixel electrode 211 has first openings 214a of the number corresponding to the number of divided parts (n=3 in the illustrated example) at predetermined positions in the pixel. The pixel electrode 211 also has four cuts 213 at predetermined positions. On the transparent substrate 210b, the counter electrode 231 of each pixel has two second openings 214b corresponding to the number of divided parts in the transmission region.

When a predetermined voltage is applied across the liquid crystal layer, three (number equal to the number of divided parts N) liquid crystal domains each having axisymmetric alignment are formed, with the center axes of the axisymmetric alignment of the liquid crystal domains being in or near the first and second openings 214a and 214b. The openings 214a and 214b formed at predetermined positions of the pixel electrode 211 and the counter electrode 231 act to fix the positions of the center axes of the axisymmetric alignment and also act to stabilize the axisymmetric alignment. The first opening 214a and the second opening 214b may be placed to be superposed one on the other in the transmission region as in the illustrated example. With this placement, the reduction in effective aperture ratio due to the existence of the pair of openings 214 can be minimized. Since one center axis is fixed/stabilized with the joint action of the first and second openings, the action exerted by the individual first or second opening 214a or 214b can be small compared with the case of fixing/stabilizing the center axis with one opening. It is therefore possible to reduce the diameter of the first and second openings 214a and 214b, and as a result, the reduction in effective aperture ratio can be minimized.

As will be described later in detail, in the LCD device of this embodiment of the present invention, voltage application for pixels arranged in a matrix having rows and columns is made so that the voltages applied to the pixel electrodes in adjacent pixels are of opposite polarity with respect to the voltage applied to the counter electrode 231 as the reference in both column and row directions in each vertical scanning period (dot inversion drive). By adopting the dot inversion drive, the alignment stabilizing effect obtained with the inclined electric field generated between adjacent pixels is obtained on four sides of each pixel having a roughly rectangular shape. Therefore, a steeply inclined electric field is generated between the adjacent pixels, acting to stabilize the axisymmetric alignment.

Moreover, in the LCD device of this embodiment, switching elements connected to one arbitrary scanning signal line include switching elements connected to pixel electrodes 211 belonging to one of a pair of rows adjacent to the scanning signal line and switching elements connected to pixel electrodes 211 belonging to the other row alternately. With this arrangement, by adopting the conventional one-line inversion drive (1H inversion drive), it is resultantly possible to apply display signals of opposite polarity with respect to the counter electrode 231 as the reference to the portions of the liquid crystal layer of adjacent pixels both in the row and column directions (1H dot inversion drive).

In the LCD device of this embodiment, also, the center of the axisymmetric alignment is fixed/stabilized in or near the opening 214 as described above. This is because liquid crystal molecules existing around the opening 214 are aligned continuously (axisymmetrically aligned) with the opening 214 as the center with the action of an inclined electric field generated with the existence of the opening 214. Thus, with the action of the opening 214 (at least either one of the first opening 214a and the second opening 214b), formation of discontinuous alignment in the corner portions, as is found in FIG. 9 in Literature 7, is minimized/prevented. Also, with the action of the opening 214, sufficiently stable axisymmetric alignment is obtained even in a grayscale display state in which the electric field is low, and thus the time required to resume normal alignment from an alignment distortion occurring when the liquid crystal display panel is pressed can be shortened.

The LCD device 200 has a shading region around each pixel, and the wall structure 215 extends on the transparent substrate 210a in the shading region. Since the shading region does not contribute to display, the wall structure 215 formed in the shading region is free from adversely affecting the display.

The wall structure 215 acts to define the directions in which liquid crystal molecules fall during voltage application (during generation of an electric field) with its slope face effect. The alignment regulating force of the side slopes of the wall structure 215 also acts during non-voltage application to tilt liquid crystal molecules. Also, the electric field generated between adjacent pixels is distorted with the wall structure 215 existing between the adjacent pixels and acts to define the directions in which liquid crystal molecules tilt near the wall faces of the wall structure 215.

With the placement of the wall structure 215, the alignment regulating force of the wall structure 215 acts cooperatively with the alignment regulating force with the steeply inclined electric field generated between adjacent pixels and the inclined electric field generated around the openings 214, to further stabilize the axisymmetric alignment. By the joint use of the wall face effect of the wall structure 215, the stability of the axisymmetric alignment in a grayscale display state in which the alignment regulating force with the inclined electric field is weak is further improved. In addition, the time required to resume normal alignment from an alignment distortion occurring when the liquid crystal display panel is pressed can be further shortened.

The illustrated wall structure 215 is a continuous wall surrounding the pixel. Alternatively, the wall structure 215 may be composed of a plurality of separate walls. The wall structure 215, which serves to define boundaries of liquid crystal domains located near the outer edges of the pixel, should preferably have a length of some extent. For example, when the wall structure is composed of a plurality of walls, each wall is preferably longer than the gap between the adjacent walls.

The cuts 213, provided as required near a boundary between axisymmetrically aligned domains, act to define the directions in which liquid crystal molecules tilt with an electric field, to form the axisymmetrically aligned domains. An inclined electric field is generated around the cuts 213, as in the openings 214a and 214b, with the application of a voltage between the pixel electrode 211 and the counter electrode 213. With this inclined electric field, acting together with an electric field near the wall faces distorted with the wall structure 215, the directions of tilt of liquid crystal molecules are defined, resulting in formation of the axisymmetric alignment as described above.

In the illustrated example, a total of four cuts 213 are given point-symmetrically with respect to the opening 214a corresponding to the center axis of a liquid crystal domain formed in the transmission region A of the pixel (in this case, the right opening in the transmission region A as viewed from FIG. 2A). With these cuts 213, when used in combination with the wall structure 215 as in the illustrated example, the directions in which liquid crystal molecules fall are defined with the inclined electric field generated around the openings 214 and the cuts 213 and the electric field distorted near the wall faces of the wall structure 215, resulting in formation of the three liquid crystal domains as described above. The placement and preferred shapes of the wall structure 215, the openings 214 and the cuts 213 are the same as those described above in relation to the transmissive LCD device 100. In the example illustrated in FIGS. 2A and 2B, the transmission region A has two liquid crystal domains and the reflection region B has one liquid crystal domain. However, the arrangement is not limited to this. Each liquid crystal domain is preferably roughly square in shape from the standpoint of the viewing angle characteristics and the stability of alignment.

Supports 233 for defining the thickness of the liquid crystal layer 220 (also called the cell gap) should preferably be formed in the shading region (in the illustrated example, the region defined by the black matrix 232) to avoid degradation of the display quality due to the supports. Although the supports 233 are formed on the wall structure 215 provided in the shading region in the illustrated example, the supports 233 may be formed on either transparent substrate 210a or 210b. In the case of forming the supports 233 on the wall structure 215, setting is made so that the sum of the height of the wall structure 215 and the height of the supports 233 is equal to the thickness of the liquid crystal layer 220. If the supports 233 are formed in a region having no wall structure 215, setting is made so that the height of the supports 233 is equal to the thickness of the liquid crystal layer 220.

In the LCD device 200, when a predetermined voltage (voltage equal to or higher than a threshold voltage) is applied between the pixel electrode 211 and the counter electrode 231, two axisymmetrically aligned domains are formed in the transmission region A, and one axisymmetrically aligned domain is formed in the reflection region B. The electric field distorted with the wall faces of the wall structure 215 and the wall face effect of the wall structure 215 mainly define the directions in which liquid crystal molecules in the three adjacent liquid crystal domains (two in the transmission region and one in the reflection region) fall with an electric field. Also, the inclined electric field generated near the four cuts 233 acts to define the directions in which liquid crystal molecules in the three adjacent liquid crystal domains fall with the electric field. Such alignment regulating forces act cooperatively, to stabilize the axisymmetric alignment of the liquid crystal domains. Moreover, the center axes of the two axisymmetrically aligned liquid crystal domains formed in the transmission region A are fixed in or near the pairs of openings 214 (each composed of the openings 214a and 214b facing each other) and stabilized. The center axis of the one axisymmetrically aligned liquid crystal domain formed in the reflection region B is stabilized with the opening 214a.

In the above description, a preferred construction of the transflective LCD device 200 having the wall structure 215 was exemplified. Like the transmissive LCD device 100' shown in FIG. 1C, the wall structure 215 may be omitted. As described above, however, the axisymmetric alignment is further stabilized with the existence of the wall structure 215. Therefore, forming the wall structure is preferred if reduction in occurrence of an afterimage due to pressing is particularly desired.

In the LCD 200 having the construction shown in FIGS. 2A and 2B, as in the LCD device 100, the axisymmetric alignment is formed stably with the action of the inclined electric field generated between adjacent pixels by adopting the dot inversion drive and the action of the inclined electric field generated around the openings 214. In addition, the pairs of openings 214 formed roughly in the center portions of the pixel electrode and the counter electrode fix/stabilize the center axes of the axisymmetrically aligned domains in the pixel. Therefore, effects such as reducing roughness of display observed when grayscale display is viewed in a slanting direction can be obtained. In addition, with the wall structure 215 formed in the shading region and the cuts 213, stable axisymmetrically aligned domains are formed even in a grayscale display state.

Furthermore, with the placement of the transparent dielectric layer 234 and/or the color filter 230 in the manner described above, the display brightness and color purity in both the transmission mode and the reflection mode can be improved.

A preferred construction of the transflective LCD device is as shown in Embodiment 1, in which the active matrix substrate shown in FIGS. 3 and 4 can be suitably used.

(Alignment Stabilizing Drive Method)

In the LCD devices of Embodiment 2 of the present invention, voltage application for pixels arranged in a matrix having rows and columns is made so that the voltages applied to the pixel electrodes in adjacent pixels are of opposite polarity with respect to the voltage applied to the counter electrode as the reference in both column and row directions in each vertical scanning period (dot inversion drive). Hereinafter, the alignment stabilizing effect obtained by adopting the dot inversion drive will be described in detail.

FIG. 5B diagrammatically shows drive circuits and the pixel arrangement of an LCD device 300B of this embodiment of the present invention. The display region of the LCD device 300B is the same as that of the LCD device 100 or 200 described above.

The LCD device 300B, which is a TFT-LCD device, has a plurality of data signal lines (source signal lines) 301 extending in parallel with each other in the column direction and a plurality of scanning signal lines (gate signal lines) 302 extending in parallel with each other in the row direction, which are respectively connected to a source signal drive circuit 303 and a gate signal drive circuit 304. The LCD device 300B has at least one TFT 305 for each pixel. The gate electrode and the source electrode of the TFT 305 are respectively connected with the corresponding scanning signal line 302 and the corresponding data signal line 301. The drain electrode of the TFT 305 is connected with a pixel electrode 306. When a predetermined voltage (scanning signal voltage) is applied to the gate electrode, the TFT 305 is turned ON, electrically connecting the pixel electrode 306 to the data signal line to thereby allow a predetermined data signal voltage to be supplied to the pixel electrode 306. A predetermined common voltage is supplied to a counter electrode (not shown) facing the pixel electrode 306 (typically facing a plurality of pixel electrodes). The difference between the common voltage supplied to the counter electrode and the data signal voltage supplied to the pixel electrode 306 is applied across a liquid crystal layer in each pixel.

In this embodiment, the TFTs 305 connected to one arbitrary scanning signal line 302 include TFTs 305 connected to pixel electrodes 306 belonging to one of a pair of rows adjacent to the scanning signal line 302 (for example, pixel electrodes 306 belonging to the upper row) and TFTs 305 connected to pixel electrodes 306 belonging to the other row (for example, pixel electrodes 306 belonging to the lower row) alternately. To state differently, TFTs 305 connected to the odd-numbered data signal lines 301, among the plurality of data signal lines 301, are placed on the upper side of the scanning signal line 302 (are connected to the pixel electrodes 306 on the upper row), and TFTs 305 connected to the even-numbered data signal lines 301 are placed on the lower side of the scanning signal line 302 (are connected to the pixel electrodes 306 on the lower row). That is, the TFTs 305 (and the pixel electrodes 306) connected to a given scanning signal line 302 are placed on the upper and lower sides of the scanning signal line 302 alternately every data signal line 301 in a zigzag fashion.

By performing the conventional one-line inversion drive for the zigzag panel construction described above, the voltages applied to adjacent pixels both in the row and column directions are of opposite polarity with respect to the counter electrode as the reference, and the polarity is switched every frame. That is, the source signal line drive circuit 303 and the gate signal line drive circuit 304 can achieve resultantly the dot inversion drive by only performing the conventional one-line inversion drive.

In this embodiment, within one frame period, a voltage opposite in polarity to a voltage supplied to an arbitrary first pixel in a matrix of pixels with respect to the counter electrode as the reference is supplied to a second pixel that is adjacent to the first pixel and connected to the scanning signal line of the same row (n-th row) as the first pixel, and also a voltage opposite in polarity to the voltage supplied to the first pixel with respect to the counter electrode as the reference is supplied to a third pixel that is connected to the data signal line of the same column as the first pixel on the n-th row and connected to the (n+1)th (or (n−1)th) scanning signal line (dot inversion drive). Moreover, the polarity of the voltage applied to each pixel is inverted every frame for all the pixels (frame inversion drive). For example, FIG. 6 shows an example of polarity pattern of the voltages applied to the pixels during a given frame period in the LCD device 300B of this embodiment. In the frame next to that shown in FIG. 6, the plus and minus are inverted for all the pixels.

FIGS. 7A to 7C show the simulation results of the behavior of equipotential lines and liquid crystal directors observed when a voltage was applied across the liquid crystal layer. The drive voltage for the liquid crystal layer was set at 4V. To check the effect of drawing equipotential lines with an electric field, comparison is made between the effects obtained when the width of the gap between adjacent pixel electrodes was 3 μm and when it was 9 μm. Also, shown are the case that voltages of the same polarity were applied to adjacent pixel electrodes as in the conventional line inversion drive and the like and the case that voltages of opposite polarity with respect to the counter electrode as the reference were applied to adjacent pixel electrodes (present invention). Specifically, FIG. 7A shows the simulation results obtained when voltages of opposite polarity were applied to adjacent pixel electrodes by the drive method in this embodiment of the present invention (inter-electrode gap: 3 μm). FIGS. 7B and 7C show the simulation results obtained when voltages of the same polarity were applied to adjacent pixels by the conventional drive method (inter-electrode gap: 3 μm and 9 μm, respectively).

It is found from the results that when voltages of opposite polarity are applied to adjacent pixels, a steep potential gradient occurs at the boundary of the pixels, resulting in more effective drawing of equipotential lines. For example, in the drive method in this embodiment, equipotential lines are drawn more effectively than in the conventional case of applying voltages of the same polarity to adjacent pixels and having an inter-pixel gap of 9 μm, causing liquid crystal molecules to be tilted with the electric field. It is also found that in the drive method in this embodiment, the alignment of liquid crystal molecules is effectively controlled with the electric field even when the inter-electrode gap is 3 μm.

As described above, a large potential gradient can be formed between adjacent pixels by performing the conventional one-line inversion drive for a panel in which the TFTs 305 (and the pixel electrodes 306) connected to an arbitrary scanning signal line 302 are placed on the upper and lower sides of the scanning signal line 302 alternately every data signal line 301 in a zigzag fashion, so that voltages of opposite polarity with respect to the counter electrode as the reference are applied to adjacent pixels both in the row and column directions for each frame. This potential gradient can be used to produce alignment regulating force for further stabilizing the axisymmetric alignment formed in a vertically aligned liquid crystal layer.

The above drive method proved useful for alignment stabilization is also very effective in reducing flickering of the liquid crystal panel.

In a general active liquid crystal panel, because of inadequate characteristics of switching elements such as TFTs provided in individual pixels, the transmittance of the liquid crystal layer is not completely symmetric in response to symmetric positive/negative data voltages that are supplied from the source signal drive circuit 303 (in the column direction). Flickering is therefore prominent in some cases in a liquid crystal panel adopting a drive method in which the polarity of the voltage applied across the liquid crystal layer is inverted every frame (one-frame inversion drive).

As measures for reducing such flickering, there is known a drive method in which the polarity is inverted every horizontal scanning line and further inverted every frame period (1H inversion drive). Also known is a drive method in which the polarity of the voltage applied across the liquid crystal layer constituting pixels is inverted every scanning signal line and also every data signal line and further inverted every frame period (dot inversion drive). This dot inversion drive, which is also adopted in this embodiment, is most effective in reducing flickering. It has however been pointed out that the dot inversion drive has the problem that the IC breakdown voltage for the source signal line drive circuit must be set high because voltages of positive and negative polarity are applied to pixel electrodes on the same scanning signal line. In this embodiment, the conventional one-line inversion drive is performed for a panel in which switching elements (and pixel electrodes) connected to an arbitrary scanning signal line are placed on the upper and lower sides of the scanning signal line alternately every data signal line in a zigzag fashion, and thus the dot inversion drive can resultantly be achieved. Accordingly, a high IC breakdown voltage is no more required unlike the conventional dot inversion drive.

Note that in the LCD devices of this embodiment of the present invention, if the wall structure is provided, the axisymmetric alignment can be stabilized by joint use of the alignment regulating force of the wall structure. Accordingly, the axisymmetric alignment can be stabilized even in grayscale display in which a sufficient electric field is not obtained, and thus the grayscale display quality can be improved. Moreover, the time required to resume normal alignment from an alignment distortion occurring when the liquid crystal display panel is pressed (an afterimage due to pressing) can be shortened.

(Operation Principle)

The reason why the LCD device having a vertically aligned liquid crystal layer of an embodiment of the present invention has excellent wide viewing angle characteristics will be described with reference to FIGS. 8A and 8B.

FIGS. 8A and 8B are views for demonstrating how the alignment regulating forces of a wall structure 15 and an opening 14a formed on the active matrix substrate and an opening 14b formed on the color filter substrate act, in which the aligned states of liquid crystal molecules during non-voltage application (FIG. 8A) and during voltage application (FIG. 8B) are diagrammatically shown. The state shown in FIG. 8B is for display of a grayscale level.

The LCD device shown in FIGS. 8A and 8B includes an insulating film 16, a pixel electrode 6 having the opening 14a at a predetermined position, the wall structure 15 and an alignment film 12 formed in this order on a transparent substrate 1. The LCD device also includes a color filter layer 18, a counter electrode 19 having the opening 14b at a predetermined position and an alignment film 32 formed in this order on another transparent substrate 17. A liquid crystal layer 20 interposed between the two substrates includes liquid crystal molecules 21 having negative dielectric anisotropy.

As shown in FIG. 8A, during non-voltage application, the liquid crystal molecules 21 are aligned roughly vertical to the substrate surface with the alignment regulating force of the vertical alignment films 12 and 32.

As shown in FIG. 8B, during voltage application, the liquid crystal molecules 21 having negative dielectric anisotropy attempt to make their major axes vertical to electric lines of force, and this causes the directions in which the liquid crystal molecules 21 fall to be defined with an inclined electric field generated around the pair of openings 14a and 14b and distortion in electric field occurring near the side faces (wall faces) of the wall structure 15 together with the alignment regulating force of the wall structure 15. In this way, the liquid crystal molecules 21 are aligned axisymmetrically around the openings 14a and 14b as the center. In the resultant axisymmetrically aligned domain, liquid crystal directors point in all directions (directions in the substrate plane), and thus, excellent viewing angle characteristics can be obtained.

The action of the inclined electric field generated around the openings 14a and 14b and the alignment regulating force of the wall structure 15 were described in the above discussion. An inclined electric field is also generated around cuts formed at edges of the pixel electrode 6, and with this inclined electric field, also, the directions of the tilt of the liquid crystal molecules 21 are defined. In particular, by adopting the dot inversion drive described above, the inclined electric field generated between adjacent pixel electrodes acts to form axisymmetric alignment of the liquid crystal molecules stably. Even when the wall structure 15 is omitted, axisymmetric alignment can be formed stably with the action of the steeply inclined electric field obtained by adopting the dot inversion drive and the action of the inclined electric field generated around the openings 14a and 14b.

Specific characteristics of the transflective LCD device of the embodiment of the present invention will be described as follows. An LCD device having the construction shown in FIG. 9 was fabricated. As the liquid crystal cell 50, one having the same construction as that of the LCD device 200 shown in FIGS. 2A and 2B was used.

In the pixel electrode of the TFT substrate, openings (first openings) having a diameter of 5 μm were formed at predetermined positions in the transmission region and the reflection region, and also the wall structure was formed above the signal lines and the like surrounding each pixel in the shading region. In the counter electrode of the counter substrate, openings (second openings) having a diameter of 5 μm for fixing the center axes of axisymmetrically aligned domains were formed at predetermined positions in the transmission region and the reflection region. Each pair of first and second openings was placed so that they are superposed one on the other spatially via the liquid crystal layer. The width of the cuts was set at 3 μm and the width of the gap between the adjacent pixel electrodes was set at 5 μm. A transparent dielectric layer having no light scattering function was formed on the color filter substrate as the transparent dielectric layer 234, and a resin layer having a continuous uneven surface was formed under the reflective electrode 211b, to adjust the diffuse reflection characteristics in the reflection display.

The vertical alignment films were formed by a known method using a known alignment film material. No rubbing was made. A liquid crystal material having negative dielectric anisotropy (Δn: 0.1 and Δ∈: −4.5) was used. In this example, the thicknesses dt and dr of the liquid crystal layer in the transmission region and the reflection region were set at 4 μm and 2.2 μm, respectively (dr=0.55dt).

The LCD device of this example had a multilayer structure composed of a polarizing plate (observer side), a quarter wave plate (phase plate 1), a phase plate having negative optical anisotropy (phase plate 2 (NR plate)), the liquid crystal layer (on the upper and lower sides thereof, the color filter substrate and the active matrix substrate were respectively placed), a phase plate having negative optical anisotropy (phase plate 3 (NR plate)), a quarter wave plate (phase plate 4), and a polarizing plate (backlight side) in the order from the observer side. The upper and lower quarter wave plates (phase plates 1 and 4) were placed so that the slower axes thereof were orthogonal to each other, and had a phase difference of 140 nm. The phase plates having negative optical anisotropy (phase plates 2 and 3) had a phase difference of 135 nm. The two polarizing plates were placed so that the absorption axes thereof were orthogonal to each other.

A drive signal was applied to the thus-obtained LCD device (4V was applied across the liquid crystal layer) to evaluate the display characteristics. In this example, in particular, switching elements were placed on the upper and lower sides of each scanning signal line alternately every data signal line in a zigzag fashion as described above and 1H line inversion was performed, so that the drive signal can be applied across the liquid crystal layer in the same manner as the dot inversion drive. That is, signals of +4V and −4V with respect to the counter electrode as the reference were applied to adjacent pixels in one frame and the polarity was inverted in the next frame, to evaluate the display characteristics.

The results of the visual angle—contrast characteristics are shown in FIG. 11. The viewing angle characteristics in the transparent display were roughly symmetric in all directions, the range CR>10 was as large as up to ±80°, and the transmission contrast was as high as 300:1 or more at the front. In addition, since the gap between the adjacent pixel electrodes could be narrowed compared with cases of adopting conventional drive methods such as the line inversion in which drive signals of the same polarity were applied to adjacent pixel electrodes, improvement in transmittance by about 15% from the conventional cases was recognized.

As for the characteristics of the reflection display, the reflectance evaluated with a spectral colorimeter (CM2002 from Minolta Co., Ltd.) was about 9.5% (value in terms of the aperture ratio of 100%) with respect to a standard diffuse plate as the reference. The contrast value of the reflection display was 25, which was high compared with the case of the conventional LCD devices.

No roughness of display was observed in visual evaluation in a slanting direction in a grayscale level (level 2 in the eight levels of grayscale).

The grayscale response time (time required for a change from level 3 to level 5 in the eight levels of grayscale) was 35 msec for the LCD device having pairs of openings formed in the upper and lower substrates. It was therefore recognized that the response time greatly improved with the construction of the liquid crystal panel according to the present invention. As for the recovery of the alignment after the display panel was pressed with a fingertip during application of 4V (white display), an afterimage was hardly observed on the pressed portion.

The liquid crystal panel according to the present invention was driven by the conventional 1H line inversion drive method in which voltages of the same polarity were applied to the adjacent pixel electrodes. As a result, when the width of the gap between the adjacent pixel electrodes was 3 μm, sufficient control of the alignment of liquid crystal molecules failed as shown in FIG. 7B, and the phenomenon of generating disclination in the liquid crystal region was recognized. Also, the display contrast and the response speed were insufficient, and degradation in display quality was conspicuous.

As described above, according to the present invention, an LCD device with excellent display quality can be implemented with a comparatively simple construction. The present invention is suitably applied to transmissive LCD devices and transflective (transmissive/reflective) LCD devices. In particular, transflective LCD devices are suitably used as display devices for mobile equipment such as mobile phones.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

This application is based on Japanese Patent Applications No. 2003-434429 filed on Dec. 26, 2003, and No. 2004-105911 filed on Mar. 31, 2004, the entire contents of which are herein incorporated by reference.

What is claimed is:

1. A liquid crystal display device comprising:
   a first substrate, a second substrate opposed to the first substrate, and a substantially vertically aligned liquid crystal layer interposed between the first substrate and the second substrate, wherein the liquid crystal display device has a plurality of pixels arranged in a matrix having rows and columns, each pixel including a first electrode formed on the first substrate, a second electrode formed on the second substrate, and the liquid crystal layer interposed between the first electrode and the second electrode, the first substrate has a shading region in gaps between the plurality of pixels, and a wall structure is placed regularly on the surface of the first substrate facing the liquid crystal layer in the shading region, at least either one of the first electrode and the second electrode has at least one opening formed at a predetermined position in the pixel, at least either one of an arbitrary row and an arbitrary column of the plurality of pixels is composed of first pixels each having the first electrode to which a voltage of positive polarity with respect to the potential at the second electrode as the reference potential is supplied and second pixels each having the first electrode to which a voltage of negative polarity is supplied, arranged alternately, in a given vertical scanning period, at least one liquid crystal domain having axisymmetric alignment is formed when at least a predetermined voltage is applied across the liquid crystal layer, and the center axis of the axisymmetric alignment of the at least one liquid crystal domain is formed in or near the at least one opening, and wherein said opening is located proximate a middle portion of the pixel and does not extend to any side of the pixel so that the axisymmetric alignment is formed around all lateral sides of said opening; and wherein the first electrode has at least one first opening formed at a predetermined position in each pixel, the second electrode has at least one second opening formed at a predetermined position in each pixel, and the center axis of the axisymmetric alignment of the at least one liquid crystal domain is formed in or near at least one of the at least one first opening and the at least one second opening.

2. The liquid crystal display device of claim 1, wherein an arbitrary row and an arbitrary column of the plurality of pixels are respectively composed of first pixels each having the first electrode to which a voltage of positive polarity with respect to the potential at the second electrode as the reference potential is supplied and second pixels each having the first electrode to which a voltage of negative polarity is supplied, arranged alternately, in a given vertical scanning period.

3. The liquid crystal display device of claim 1, wherein the polarity of the voltage supplied to the first electrode of each of the plurality of pixels is inverted every vertical scanning period.

4. The liquid crystal display device of claim 1, wherein the first electrode has at least one cut.

5. The liquid crystal display device of claim 1, wherein a support for defining the thickness of the liquid crystal layer is placed in the shading region located in gaps between the plurality of pixels.

6. The liquid crystal display device of claim 1, wherein the first electrode includes a transparent electrode defining a transmission region and a reflective electrode defining a reflection region, and the thickness dt of the liquid crystal layer in the transmission region and the thickness dr of the liquid crystal layer in the reflection region satisfy the relationship 0.3dt<dr<0.7dt.

7. The liquid crystal display device of claim 6, wherein a transparent dielectric layer is selectively formed on the second substrate in the reflection region.

8. The liquid crystal display device of claim 7, wherein the transparent dielectric layer has a function of scattering light.

9. The liquid crystal display device of claim 6, further comprising a color filter layer formed on the second substrate, wherein the optical density of the color filter layer in the reflection region is lower than that in the transmission region.

10. The liquid crystal display device of claim 1, further comprising: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

11. The liquid crystal display device of claim 1, further comprising: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

12. A liquid crystal display device comprising:

a first substrate, a second substrate opposed to the first substrate, and a substantially vertically aligned liquid crystal layer interposed between the first substrate and the second substrate, a plurality of pixels arranged in a matrix having rows and columns, each pixel including a first electrode formed on the first substrate, a second electrode formed on the second substrate, and the liquid crystal layer interposed between the first electrode and the second electrode, the first substrate has a shading region in gaps between the plurality of pixels, and a wall structure is placed regularly on the first substrate facing the liquid crystal layer in the shading region, at least either one of the first electrode and the second electrode has at least one opening formed at a predetermined position in the pixel, at least either one of an arbitrary row and an arbitrary column of the plurality of pixels comprises first pixels each having the first electrode to which a voltage of positive polarity with respect to the potential at the second electrode as the reference potential is supplied and second pixels each having the first electrode to which a voltage of negative polarity is supplied, arranged alternately, in a given vertical scanning period, at least one liquid crystal domain having axisymmetric alignment is formed when at least a predetermined voltage is applied across the liquid crystal layer, and the center axis of the axisymmetric alignment of the at least one liquid crystal domain is formed in or near the at least one opening;

wherein the first electrode has at least one first opening formed at a predetermined position in each pixel, the second electrode has at least one second opening formed at a predetermined position in each pixel, and the center axis of the axisymmetric alignment of the at least one liquid crystal domain is formed in or near at least either one of the at least one first opening and the at least one second opening; and wherein the at least one first opening and the at least one second opening are placed to at least overlap each other via the liquid crystal layer.

13. A liquid crystal display device comprising:

a first substrate, a second substrate opposed to the first substrate, and a substantially vertically aligned liquid crystal layer interposed between the first substrate and the second substrate, a plurality of pixels arranged in a matrix having rows and columns, each pixel including a first electrode formed on the first substrate, a second electrode formed on the second substrate, and the liquid crystal layer interposed between the first electrode and the second electrode, the first substrate has a shading region in gaps between the plurality of pixels, and a wall structure is placed regularly on the first substrate facing the liquid crystal layer in the shading region, at least either one of the first electrode and the second electrode has at least one opening formed at a predetermined position in the pixel, at least either one of an arbitrary row and an arbitrary column of the plurality of pixels comprises first pixels each having the first electrode to which a voltage of positive polarity with respect to the potential at the second electrode as the reference potential is supplied and second pixels each having the first electrode to which a voltage of negative polarity is supplied, arranged alternately, in a given vertical scanning period, at least one liquid crystal domain having axisymmetric alignment is formed when at least a predetermined voltage is applied across the liquid crystal layer, and the center axis of the axisymmetric alignment of the at least one liquid crystal domain is formed in or near the at least one opening; and wherein the first electrode includes a transparent electrode defining a transmission region and a reflective electrode defining a reflection region, the at least one liquid crystal domain includes a liquid crystal domain formed in the transmission region, the first electrode has at least one first opening, the second electrode has at least one second opening, the at least one first opening and the at least one second opening include an opening corresponding to the center axis of the liquid crystal domain formed in the transmission region, and the first electrode has a plurality of cuts formed point-symmetrically with respect to the opening.

14. A liquid crystal display device comprising:

a first substrate, a second substrate opposed to the first substrate, and a substantially vertically aligned liquid crystal layer interposed between the first substrate and the second substrate, the first substrate including a plurality of scanning signal lines extending in the row direction, a plurality of data signal lines extending in the column direction, a plurality of switching elements connected to the plurality of scanning signal lines and the plurality of data signal lines, and a plurality of first electrodes connected to the plurality of data signal lines via the plurality of switching elements, the second substrate including a second electrode opposed to the plurality of first electrodes via the liquid crystal layer, the liquid crystal display device having a plurality of pixels arranged in a matrix having rows and columns, each pixel including each of the plurality of first electrodes, the second electrode and the liquid crystal layer interposed between the first electrode and the second electrode, and having a shading region in gaps between the plurality of pixels, wherein switching elements, among the plurality of switching elements, connected to one arbitrary scanning signal line among the plurality of scanning signal lines include switching elements connected to first electrodes belonging to one of a pair of rows adjacent to the arbitrary scanning signal line and switching elements connected to first electrodes belonging to the other row alternately, and an arbitrary row of the plurality of pixels includes first pixels each having the first electrode to which a voltage of positive polarity with respect to a potential at the second electrode as the reference potential is supplied and second pixels each having the first electrode to which a voltage of negative polarity is supplied, arranged alternately, during a given vertical scanning period, at least either one of the first electrode and the second electrode has at least one opening formed at a predetermined position in each pixel, at least one liquid crystal domain having axisymmetric alignment is formed when at least a predetermined voltage is applied across the liquid crystal layer, and the center axis of the axisymmetric alignment of the at least one liquid crystal domain is formed in or near the at least one opening, and wherein said opening is located proximate a middle portion of the pixel and does not extend to any side of the pixel so that the axisymmetric alignment is formed around all lateral sides of said opening; and wherein the first electrode has at least one first opening formed at a predetermined position in each pixel, the second electrode has at least one second opening formed at a predetermined position in each pixel, and the center axis of the axisymmetric alignment of the at least one liquid crystal domain is formed in or near at least either one of the at least one first opening and the at least one second opening.

15. The liquid crystal display device of claim 14, wherein the first substrate further includes a wall structure placed regularly on the surface facing the liquid crystal layer in the shading region.

16. The liquid crystal display device of claim 14, wherein an arbitrary column of the plurality of pixels includes first pixels each having the first electrode to which a voltage of positive polarity with respect to the potential at the second electrode as the reference potential is supplied and second pixels each having the first electrode to which a voltage of negative polarity is supplied, the arranged alternately, during a given vertical scanning period.

17. The liquid crystal display device of claim 14, wherein the polarity of the voltage supplied to the first electrode of each of the plurality of pixels is inverted every vertical scanning period.

18. The liquid crystal display device of claim 14, wherein the first electrode has at least one cut.

19. The liquid crystal display device of claim 14, wherein a support for defining the thickness of the liquid crystal layer is placed in the shading region.

20. The liquid crystal display device of claim 14, wherein the first electrode includes a transparent electrode defining a transmission region and a reflective electrode defining a reflection region, and the thickness dt of the liquid crystal layer in the transmission region and the thickness dr of the liquid crystal layer in the reflection region satisfy the relationship 0.3dt<dr<0.7dt.

21. The liquid crystal display device of claim 20, wherein a transparent dielectric layer is selectively formed on the second substrate in the reflection region.

22. The liquid crystal display device of claim 21, wherein the transparent dielectric layer has a function of scattering light.

23. The liquid crystal display device of claim 20, further comprising a color filter layer formed on the second substrate, wherein the optical density of the color filter layer in the reflection region is lower than that in the transmission region.

24. The liquid crystal display device of claim 14, further comprising: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

25. The liquid crystal display device of claim 14, further comprising: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

26. A liquid crystal display device comprising:
a first substrate, a second substrate opposed to the first substrate, and a substantially vertically aligned liquid crystal layer interposed between the first substrate and the second substrate,
the first substrate including a plurality of scanning signal lines extending in the row direction, a plurality of data signal lines extending in the column direction, a plurality of switching elements connected to the plurality of scanning signal lines and the plurality of data signal lines, and a plurality of first electrodes connected to the plurality of data signal lines via the plurality of switching elements,
the second substrate including a second electrode opposed to the plurality of first electrodes via the liquid crystal layer,
the liquid crystal display device having a plurality of pixels arranged in a matrix having rows and columns, each pixel including each of the plurality of first electrodes, the second electrode and the liquid crystal layer interposed between the first electrode and the second electrode, and having a shading region in gaps between the plurality of pixels,
wherein switching elements, among the plurality of switching elements, connected to an arbitrary scanning signal line among the plurality of scanning signal lines include switching elements connected to first electrodes belonging to one of a pair of rows adjacent to the arbitrary scanning signal line and switching elements connected to first electrodes belonging to the other row alternately, and an arbitrary row of the plurality of pixels includes first pixels each having the first electrode to which a voltage of positive polarity with respect to a potential at the second electrode as the reference potential is supplied and second pixels each having the first electrode to which a voltage of negative polarity is supplied, arranged alternately, during a given vertical scanning period, and
at least either one of the first electrode and the second electrode has at least one opening formed at a predetermined position in each pixel, at least one liquid crystal domain having axisymmetric alignment is formed when at least a predetermined voltage is applied across the liquid crystal layer, and the center axis of the axisymmetric alignment of the at least one liquid crystal domain is formed in or near the at least one opening;
wherein the first electrode has at least one first opening formed at a predetermined position in each pixel, the second electrode has at least one second opening formed at a predetermined position in each pixel, and the center axis of the axisymmetric alignment of the at least one liquid crystal domain is formed in or near at least either one of the at least one first opening and the at least one second opening; and
wherein the at least one first opening and the at least one second opening are placed to at least overlap each other via the liquid crystal layer.

27. A liquid crystal display device comprising:
a first substrate, a second substrate opposed to the first substrate, and a substantially vertically aligned liquid crystal layer interposed between the first substrate and the second substrate,
the first substrate including a plurality of scanning signal lines extending in the row direction, a plurality of data signal lines extending in the column direction, a plurality of switching elements connected to the plurality of scanning signal lines and the plurality of data signal lines, and a plurality of first electrodes connected to the plurality of data signal lines via the plurality of switching elements,
the second substrate including a second electrode opposed to the plurality of first electrodes via the liquid crystal layer,
the liquid crystal display device having a plurality of pixels arranged in a matrix having rows and columns, each pixel including each of the plurality of first electrodes, the second electrode and the liquid crystal layer interposed between the first electrode and the second electrode, and having a shading region in gaps between the plurality of pixels,
wherein switching elements, among the plurality of switching elements, connected to an arbitrary scanning signal line among the plurality of scanning signal lines include switching elements connected to first electrodes belonging to one of a pair of rows adjacent to the arbitrary scanning signal line and switching elements connected to first electrodes belonging to the other row alternately, and an arbitrary row of the plurality of pixels includes first pixels each having the first electrode to which a voltage of positive polarity with respect to a potential at the second electrode as the reference potential is supplied and second pixels each having the first electrode to which a voltage of negative polarity is supplied, arranged alternately, during a given vertical scanning period, and
at least either one of the first electrode and the second electrode has at least one opening formed at a predetermined position in each pixel, at least one liquid crystal domain having axisymmetric alignment is formed when at least a predetermined voltage is applied across the liquid crystal layer, and the center axis of the axisymmetric alignment of the at least one liquid crystal domain is formed in or near the at least one opening; and
wherein the first electrode includes a transparent electrode defining a transmission region and a reflective electrode defining a reflection region, the at least one liquid crystal domain includes a liquid crystal domain formed in the transmission region, the first electrode has at least one first opening, the second electrode has at least one second opening, the at least one first opening and the at least one second opening include an opening corresponding to the center axis of the liquid crystal domain formed in the transmission region, and
the first electrode has a plurality of cuts formed point-symmetrically with respect to the opening.

* * * * *